US011827809B2

(12) United States Patent
Zawacky et al.

(10) Patent No.: US 11,827,809 B2
(45) Date of Patent: Nov. 28, 2023

(54) ELECTRODEPOSITABLE COATING COMPOSITIONS AND ELECTRICALLY CONDUCTIVE COATINGS RESULTING THEREFROM

(71) Applicant: PPG Industries Ohio, Inc., Cleveland, OH (US)

(72) Inventors: Steven R. Zawacky, Cranberry Township, PA (US); Egle Puodziukynaite, Allison Park, PA (US); Stephen L. Milanak, Jr., Ford City, PA (US); Michael G. Sandala, Pittsburgh, PA (US); John T. Donnelly, Monroeville, PA (US); Corey J. DeDomenic, Pittsburgh, PA (US); Kevin T. Sylvester, Lawrence, PA (US); Minh An Thi Nguyen, Pittsburgh, PA (US); Landon J. Oakes, Allison Park, PA (US); Brian C. Okerberg, Gibsonia, PA (US); Ross A. Moretti, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 479 days.

(21) Appl. No.: 16/956,815

(22) PCT Filed: Dec. 20, 2018

(86) PCT No.: PCT/US2018/066796
§ 371 (c)(1),
(2) Date: Jun. 22, 2020

(87) PCT Pub. No.: WO2019/126498
PCT Pub. Date: Jun. 27, 2019

(65) Prior Publication Data
US 2020/0399479 A1 Dec. 24, 2020

Related U.S. Application Data

(60) Provisional application No. 62/608,087, filed on Dec. 20, 2017.

(51) Int. Cl.
*C09D 5/44* (2006.01)
*C08K 3/08* (2006.01)
*C09D 7/62* (2018.01)
*C08K 9/06* (2006.01)
*C09D 5/24* (2006.01)

(52) U.S. Cl.
CPC ............. *C09D 5/448* (2013.01); *C08K 3/08* (2013.01); *C08K 9/06* (2013.01); *C09D 5/24* (2013.01); *C09D 5/4453* (2013.01); *C09D 5/4465* (2013.01); *C09D 5/4469* (2013.01); *C09D 5/4496* (2013.01); *C09D 7/62* (2018.01); *C08K 2003/0812* (2013.01); *C08K 2003/0893* (2013.01); *C08K 2201/001* (2013.01)

(58) Field of Classification Search
CPC ............................................... C08K 2003/0812
See application file for complete search history.

(56) References Cited

U.S. PATENT DOCUMENTS

| 3,464,906 | A | | 9/1969 | Ridley et al. |
| 3,616,397 | A | | 10/1971 | Lohr |
| 4,081,341 | A | | 3/1978 | Christenson et al. |
| 4,670,188 | A | | 6/1987 | Iwasa et al. |
| 5,203,975 | A | * | 4/1993 | Richardson ............ C25D 13/22 204/501 |
| 5,378,335 | A | | 1/1995 | Hoppe-Hoeffler et al. |
| 9,150,736 | B2 | | 10/2015 | Daughenbaugh et al. |
| 9,273,399 | B2 | | 3/2016 | Hellring et al. |
| 9,520,591 | B2 | | 12/2016 | Daughenbaugh et al. |
| 9,970,123 | B2 | | 5/2018 | Moravek et al. |
| 10,358,735 | B2 | | 7/2019 | Gebregiorgis |
| 2008/0190769 | A1 | | 8/2008 | Schuster et al. |
| 2008/0199721 | A1 | * | 8/2008 | Scott ...................... C09D 5/106 428/626 |
| 2010/0163420 | A1 | * | 7/2010 | Weiss ...................... C09D 5/36 205/80 |
| 2013/0341194 | A1 | | 12/2013 | Fuchsbichler et al. |
| 2015/0280239 | A1 | | 10/2015 | Hellring et al. |
| 2018/0291213 | A1 | * | 10/2018 | Shinke ...................... B05D 7/57 |

FOREIGN PATENT DOCUMENTS

| CA | 842772 | A | | 5/1970 |
| CA | 2894388 | A1 | * | 6/2014 |
| DE | 3003286 | A1 | | 8/1981 |
| DE | 2007 022 379 | A1 | * | 11/2008 |
| EP | 033 465 | B2 | * | 1/1981 |
| EP | 1700930 | A1 | | 9/2006 |
| FR | 2333842 | A1 | | 7/1977 |

(Continued)

OTHER PUBLICATIONS

Machine translation of CN 106947983 (no date).*

*Primary Examiner* — Marc S Zimmer
(74) *Attorney, Agent, or Firm* — Charles M. Yeomans

(57) ABSTRACT

The present invention is directed towards an electrodepositable coating composition comprising a film-forming binder and electrically conductive particles, wherein the electrically conductive particles are present in an amount of at least 25% by weight, based on the total solids weight of the electrodepositable coating composition. The present invention is also directed towards methods of coating a substrate, coatings, and coated substrates.

23 Claims, No Drawings

(56) References Cited

FOREIGN PATENT DOCUMENTS

| | | | |
|---|---|---|---|
| GB | 1096067 A | | 12/1967 |
| GB | 1310061 A | * | 3/1973 |
| JP | 2006137865 A | | 6/2006 |
| RU | 2445332 C2 | | 3/2012 |
| WO | 2007121549 A1 | | 1/2007 |

* cited by examiner

ELECTRODEPOSITABLE COATING COMPOSITIONS AND ELECTRICALLY CONDUCTIVE COATINGS RESULTING THEREFROM

FIELD OF THE INVENTION

This application claims the benefit of U.S. Provisional Patent Application Ser. No. 62/608,087, filed on Dec. 20, 2017, incorporated herein by reference.

FIELD OF THE INVENTION

The present invention is directed towards electrodepositable coating compositions comprising electrically conductive particles and conductive coatings resulting therefrom.

BACKGROUND INFORMATION

Electrodeposition is widely used today to provide uniform corrosion consistent coatings to conductive articles; however, these coatings largely consist of organic polymer and are not very heat, abrasion or chemically resistant. These coatings do not offer good thermal or electrical conductivity even when formulated to do so.

Additionally, current electrodepositable coatings do not provide galvanic protection to the underlying substrate. The only methods for applying galvanically protective sacrificial protective coatings, such as aluminum and zinc coatings, to a part or assembly involves treating the metal used to fabricate the part by applying the zinc or aluminum directly to the substrate during manufacture by dipping the substrate into molten metal; by electrochemical plating; or by coating the finished product with a solventborne zinc or aluminum rich coating. These methods involve high temperature, considerable waste, slow processing, non-uniform coverage, inert atmospheres, or high volatile organic content (VOC).

It would be desirable to provide efficient, quick, uniform application of heat, abrasion, chemically resistant coatings that offer good thermal and electrical conductivity. It would also be desirable to provide efficient, quick, uniform application of galvanically active coatings that do not require high temperature, considerable waste, slow processing, non-uniform coverage, inert atmospheres, or high VOC.

SUMMARY OF THE INVENTION

Disclosed herein is an electrodepositable coating composition comprising a film-forming binder and electrically conductive particles; wherein the electrically conductive particles are present in an amount of at least 25% by weight, based on the total solids weight of the electrodepositable coating composition.

Further disclosed herein is a method of coating a substrate, the method comprising electrophoretically applying an electrodepositable coating composition comprising a film-forming binder and electrically conductive particles, wherein the electrically conductive particles are present in an amount of at least 25% by weight, based on the total solids weight of the electrodepositable coating composition, to the substrate to form a coating, and subjecting the coating to curing conditions sufficient to at least partially cure the coating.

Still further disclosed herein are coatings and coated substrates produced from or coated by the electrodepositable coating compositions and methods of the present invention.

DETAILED DESCRIPTION OF THE INVENTION

As stated above, the present invention is directed to an electrodepositable coating composition comprising, consisting essentially of, or consisting of a film-forming binder, electrically conductive particles and water; wherein the electrically conductive particles are present in an amount of at least 25% by weight, based on the total solids weight of the electrodepositable coating composition.

Electrically Conductive Particles

According to the present invention, the electrodepositable coating composition comprises electrically conductive particles. The electrically conductive particles may comprise any particles capable of conducting electricity. As used herein, an electrically conductive particle is "capable of conducting electricity" if the material has a conductivity of at least $1 \times 10^5$ S/m and a resistivity of no more than $1 \times 10^{-6}$ Ω·m at 20° C. The electrically conductive particles may comprise, consist essentially of, or consist of metals or non-metal conductive particles, as well as combinations thereof. As used herein, the term "particles" refers to material in the form of particulates, such as powder or dust, as well as flakes, and may be in the form of any shape, such as, for example, spherical, platelet, ellipsoidal, cubical, rod-shaped, disk-shaped, prism-shaped, and the like.

The electrically conductive particles may have an average particle size of at least 0.5 micron, such as at least 1 micron, such as at least 2 microns, such as at least 3 microns, such as at least 4 microns, such as at least 5 microns, such as at least 5.5 microns, such as at least 6 microns, and may be no more than 30 microns, such as no more than 20 microns, such as no more than 10 microns, such as no more than 8 microns. The electrically conductive particles may have an average particle size of 0.5 to 30 microns, such as 1 to 30 microns, such as 2 to 30 microns, such as 3 to 30 microns, such as 4 to 30 microns, such as 5 to 20 microns, such as 5.5 to 10 microns, such as 6 to 8 microns. The particle size selected may be dependent upon the thickness of the desired coating. For example, thin coatings may require smaller particle sizes, while thicker coatings could tolerate larger particles. In addition, the electrically conductive particles may comprise particles having a plurality of particle sizes. The average particle size may be measured according to ASTM B330 using a Fisher Sub-Sieve Sizer. The method of operation measures the porosity of a packed column of the powder by passing air through the column and measuring the pressure drop which is proportional to the void volume of the powder. The void volume is directly related to the average particle size.

The electrically conductive particles may comprise, consist essentially of, or consist of metal particles. The metal particles may comprise metals, metal alloys, or combinations thereof. The metal particles may comprise, for example, zinc, aluminum, cadmium, magnesium, beryllium, copper, silver, gold, iron, titanium, nickel, manganese, chromium, scandium, yttrium, zirconium, platinum, tin, and alloys thereof. The metal particles may also comprise various grades of steel. The metal particles may further comprise metal-coated particles, such as glass or ceramic materials including, for example, silicon dioxide, boron nitride, graphite, silicon carbide, zirconia particles and the like, coated with a metal such as, for example, copper, nickel, zinc, aluminum, magnesium, and the like. As used herein, reference to a specific metal when referring to metal particles refers to metal particles comprising at least 92% of that metal with the rest of the metal particle including impurities in the form of other metals or metal oxides, such as, for example, metal particles marketed as zinc powder or zinc dust, and includes metal particles having up to 100% metallic zinc as well as metal particles marketed as aluminum powder or aluminum dust, and includes metal particles having up to 100% metallic aluminum. As used herein, reference to a specific metal alloy refers to an alloy of that metal having that metal present as the predominant metal, such as an alloy comprising more than 50% by weight of the metal, based on the total weight of the metal alloy. For example, a "zinc alloy" refers to an alloy having zinc as the predominant metal, such as an alloy comprising more than 50% by weight of zinc, based on the total weight of the zinc alloy, and an "aluminum alloy" refers to an alloy having aluminum as the predominant metal, such as an alloy comprising more than 50% by weight aluminum, based on the total weight of the aluminum alloy.

The metal particles may comprise, consist essentially of, or consist of galvanically active metal particles. As used herein, the term "galvanically active metal particles" refers to metal or metal-alloy particles that are more active and less noble than the underlying substrate. The activity or nobility of a metal or metal-alloy may be determined by reference to the galvanic series, which ranks metal/metal alloys according to their electrical potential with reference to a standard electrode, such as provided in Atlas Steels' Atlas TECH NOTE NO. 7, "Galvanic Corrosion," August 2010 (with reference to a Standard Calomel Electrode (S.C.E.)). The use of galvanically active metal particles in the electrodepositable coating composition of the present invention may produce a sacrificial coating that preferentially oxidizes such that oxidation of the underlying substrate is reduced or prevented. Accordingly, what constitutes galvanically active metal particles will depend upon the substrate to which the electrodepositable coating composition is applied. For example, for mild steel substrates and more noble substrates, the galvanically active metal particles may comprise, consist essentially of, or consist of particles of magnesium, beryllium, zinc, aluminum and alloys thereof, including zinc/aluminum alloys, zinc/aluminum/magnesium, and zinc/tin alloys. For example, for aluminum alloy substrates and more noble substrates, the galvanically active metal particles may comprise particles of magnesium, beryllium, zinc, or alloys thereof.

The electrically conductive particles may comprise at least 50% by weight metal particles, such as at least 75% by weight metal particles, such as at least 90% by weight metal particles, such as at least 95% by weight metal particles, such as at least 98% by weight metal particles, such as 100% by weight metal particles, based on the total weight of the electrically conductive particles. The electrically conductive particles may comprise 50% to 100% by weight metal particles, such as 75% to 100% by weight metal particles, such as 90% to 100% by weight metal particles, such as 95% to 100% by weight metal particles, such as 98% to 100% by weight metal particles, based on the total weight of the electrically conductive particles.

The electrically conductive particles may comprise at least 50% by weight galvanically active metal particles, such as at least 75% by weight galvanically active metal particles, such as at least 90% by weight galvanically active metal particles, such as at least 95% by weight galvanically active metal particles, such as at least 98% by weight galvanically active metal particles, such as 100% by weight galvanically active metal particles, based on the total weight of the electrically conductive particles. The electrically conductive particles may comprise 50% to 100% by weight galvanically active metal particles, such as 75% to 100% by weight galvanically active metal particles, such as 90% to 100% by weight galvanically active metal particles, such as 95% to 100% by weight galvanically active metal particles, such as 98% to 100% by weight galvanically active metal particles, based on the total weight of the electrically conductive particles.

The electrically conductive particles may comprise at least 50% by weight zinc particles, such as at least 75% by weight zinc particles, such as at least 90% by weight zinc particles, such as at least 95% by weight zinc particles, such as at least 98% by weight zinc particles, such as 100% by weight zinc particles, based on the total weight of the electrically conductive particles. The electrically conductive particles may comprise 50% to 100% by weight zinc particles, such as 75% to 100% by weight zinc particles, such as 90% to 100% by weight zinc particles, such as 95% to 100% by weight zinc particles, such as 98% to 100% by weight zinc particles, based on the total weight of the electrically conductive particles.

The electrically conductive particles may comprise at least 50% by weight aluminum particles, such as at least 75% by weight aluminum particles, such as at least 90% by weight aluminum particles, such as at least 95% by weight aluminum particles, such as at least 98% by weight aluminum particles, such as 100% by weight aluminum particles, based on the total weight of the electrically conductive particles. The electrically conductive particles may comprise 50% to 100% by weight aluminum particles, such as 75% to 100% by weight aluminum particles, such as 90% to 100% by weight aluminum particles, such as 95% to 100% by weight aluminum particles, such as 98% to 100% by weight aluminum particles, based on the total weight of the electrically conductive particles.

The conductive particles may comprise surface treated conductive particles. The surface treatment may react or interact with the conductive particle surface and impart stability to the dispersed conductive particle. The surface treatment may comprise surface treatment dispersant molecules. As used herein, the term "surface treatment dispersant molecules" refers to chemical species which will react or interact with a conductive particle or pigment. The surface treatment dispersant molecules may be comprised of two distinct functionalities: a reactive group and a tail group. The reactive group may include silanes, carboxylic acids, phosphonic acids, and quaternary ammonium ion, or salts thereof. As used herein, a "reactive group" with respect to the surface treatment dispersant molecule is defined as a functional group that can interact with a conductive particle surface either through chemical reaction, ion pairing, or chemical absorption. The tail group comprises a second functionality that helps to prevent the interaction of conductive particles with each other and therefore prevents agglomeration that may increase the amount of conductive particle sedimentation, such as, for example, a $C_{10}$ or greater substituted or unsubstituted alkyl group. For example, the surface treated metal particles may comprise metal particles surface treated with an alkoxysilane. The alkoxysilane may comprise a polyether-functional alkoxysilane, such as a poly(ethylene glycol)-functional alkoxysilane wherein the reactive group comprises a silane and the tail group comprises a poly(ethylene glycol), or an amino-functional alkoxysilane wherein the reactive group comprises a silane and the tail group comprises an amine. Suitable commercially available poly(ethylene glycol)-functional alkoxysilane includes DYNASYLAN 4148, and suitable commercially available amino-functional alkoxysilanes include DYNASYLAN 1189, each available from Evonik Industries. The surface treated conductive particles may comprise conductive particles surface treated with a $C_{10}$ or greater alkyl quaternary ammonium ion, such as, for example, cetyltrimethylammonium chloride (CTAC), wherein the reactive group comprises the quaternary ammonium ion and the tail group comprises the cetyl group. The surface treated conductive particles may comprise metal particles treated with a phosphonic acid or phosphonate, such as, for example, polyvinylphosphonic acid (PVPA), wherein the reactive group comprises the phosphonate and the tail group comprises poly(vinyl). The surface treated conductive particles may comprise metal particles treated with a fatty acid, such as, for example, 12-hydroxystearic acid, wherein the reactive group comprises the carboxylate and the tail group comprises a stearic group. Other surface treatments may comprise linear or branched carboxylic acids, such as, for example, 2-ethylhexanoic acid.

The surface treated metal particles may optionally be further reacted with a crosslinking agent for crosslinking the surface treatment dispersing molecules to improve bonding of the surface treatment dispersing molecules and the metal particle. For example, the silane surface treatment of metal particles may result in the formation of oligomers of condensed silanes/silanols on the surface of the metal particle. Suitable crosslinking agents for crosslinking silanes into such oligomeric networks include, for example, titanates, zirconates and silanes.

The non-metal conductive particles may comprise conductive carbon, carbon black, carbon nanotubes, graphene, some forms of graphene oxide, carbon fibers, fullerenes and the like, or conductive silica, as well as combinations thereof.

The electrically conductive particles may comprise at least 0.1% by weight non-metal conductive particles, such as at least 0.5% by weight non-metal conductive particles, such as at least 1% by weight non-metal conductive particles, such as at least 2% by weight non-metal conductive particles, and may comprise no more than 50% by weight non-metal conductive particles, such as no more than 25% by weight non-metal conductive particles, such as no more than 5% by weight non-metal conductive particles, such as no more than 2% by weight non-metal conductive particles, based on the total weight of the electrically conductive particles. The electrically conductive particles may comprise 0% to 50% by weight non-metal conductive particles, such as 0.1% to 50% by weight non-metal conductive particles, such as 0.1% to 25% by weight non-metal conductive particles, such as 0.5% to 5% by weight non-metal conductive particles, such as 1% to 2% by weight non-metal conductive particles, based on the total weight of the electrically conductive particles. Alternatively, the electrodepositable coating composition may be substantially free, essentially free, or completely free of non-metal conductive particles.

The electrically conductive particles may be present in the electrodepositable coating composition in an amount of at least 25% by weight, such as at least 50% by weight, such as at least 60% by weight, such as at least 70% by weight, such as at least 74% by weight, and may be present in an amount of no more than 99% by weight, such as no more than 98% by weight, such as no more than 95% by weight, such as no more than 94% by weight, such as no more than 92% by weight, the percent by weight being based upon the total solids weight of the coating composition. The electrically conductive particles may be present in the electrodepositable coating composition in an amount of 25% to 99% by weight, such as 50% to 98% by weight, such as 60% to 95% by weight, such as 70% to 94% by weight, such as 74% to 92% by weight, the percent by weight being based upon the total solids weight of the electrodepositable coating composition. As used herein, "total solids" refers to the non-volatile content of the electrodepositable coating composition, i.e., materials which will not volatilize when heated to 110° C. for 15 minutes at standard atmospheric pressure (101.325 kPa, 1.01325 bar or 1 atm), and specifically includes at least the electrically conductive particles and film-forming binder.

The electrically conductive particles may comprise aluminum present in the electrodepositable coating composition in an amount of at least 25% by weight, such as at least 60% by weight, such as at least 70% by weight, such as at least 74% by weight, and may be present in an amount of no more than 99% by weight, such as no more than 94% by weight, such as no more than 90% by weight, such as no more than 85% by weight, such as no more than 82% by weight, the percent by weight being based upon the total solids weight of the coating composition. The electrically conductive particles may comprise aluminum present in the electrodepositable coating composition in an amount of 25% to 99% by weight, such as 60% to 94% by weight, such as 70% to 85% by weight, such as 74% to 82% by weight, the percent by weight being based upon the total solids weight of the electrodepositable coating composition.

The electrically conductive particles may comprise zinc present in the electrodepositable coating composition in an amount of at least 25% by weight, such as at least 60% by weight, such as at least 80% by weight, such as at least 85% by weight, and may be present in an amount of no more than 99% by weight, such as no more than 97% by weight, such as no more than 95% by weight, such as no more than 92% by weight, the percent by weight being based upon the total solids weight of the coating composition. The electrically conductive particles may comprise zinc present in the electrodepositable coating composition in an amount of 25% to 99% by weight, such as 60% to 97% by weight, such as 80% to 95% by weight, such as 85% to 92% by weight, the percent by weight being based upon the total solids weight of the electrodepositable coating composition.

According to the present invention, the electrodepositable coating composition may be substantially free, essentially free, or completely free of any of the specific electrically conductive particles described above.

Film-Forming Binder

According to the present invention, the electrodepositable coating composition comprises a film-forming binder. The film-forming binder may comprise an ionic salt group-containing film-forming polymer and, optionally, a curing agent.

According to the present invention, the ionic salt group-containing film-forming polymer may comprise a cationic salt group-containing film-forming polymer. The cationic salt group-containing, film-forming polymer may be used in a cationic electrodepositable coating composition. As used herein, the term "cationic salt group-containing film-forming polymer" refers to polymers that include at least partially neutralized cationic groups, such as sulfonium groups and ammonium groups, that impart a positive charge. As used herein, the term "polymer" encompasses, but is not limited to, oligomers and both homopolymers and copolymers. The cationic salt group-containing film-forming polymer may comprise active hydrogen functional groups. As used herein, the term "active hydrogen functional groups" refers to those groups that are reactive with isocyanates as determined by the Zerewitinoff test described in the JOURNAL OF THE AMERICAN CHEMICAL SOCIETY, Vol. 49, page 3181 (1927), and include, for example, hydroxyl groups, primary or secondary amino groups, and thiol groups. Cationic salt group-containing film-forming polymers that comprise active hydrogen functional groups may be referred to as active hydrogen-containing, cationic salt group-containing film-forming polymers.

Examples of polymers that are suitable for use as the cationic salt group-containing film-forming polymer in the present invention include, but are not limited to, alkyd polymers, acrylic polymers, polyepoxide polymers, polyamide polymers, polyurethane polymers, polyurea polymers, polyether polymers, and polyester polymers, among others.

The cationic salt groups may be incorporated into the cationic salt group-containing film-forming polymer as follows: The film-forming polymer may be reacted with a cationic salt group former. By "cationic salt group former" is meant a material which is reactive with epoxy groups present and which may be acidified before, during, or after reaction with the epoxy groups on the film-forming polymer to form cationic salt groups. Examples of suitable materials include amines such as primary or secondary amines which can be acidified after reaction with the epoxy groups to form amine salt groups, or tertiary amines which can be acidified prior to reaction with the epoxy groups and which after reaction with the epoxy groups form quaternary ammonium salt groups. Examples of other cationic salt group formers are sulfides which can be mixed with acid prior to reaction with the epoxy groups and form ternary sulfonium salt groups upon subsequent reaction with the epoxy groups.

More specific examples of suitable active hydrogen-containing, cationic salt group containing film-forming polymers include polyepoxide-amine adducts, such as the adduct of a polyglycidyl ether of a polyphenol, such as Bisphenol A, and primary and/or secondary amines, such as are described in U.S. Pat. No. 4,031,050 at col. 3, line 27 to col. 5, line 50, U.S. Pat. No. 4,452,963 at col. 5, line 58 to col. 6, line 66, and U.S. Pat. No. 6,017,432 at col. 2, line 66 to col. 6, line 26, these portions of which being incorporated herein by reference. A portion of the amine that is reacted with the polyepoxide may be a ketimine of a polyamine, as is described in U.S. Pat. No. 4,104,117 at col. 6, line 23 to col. 7, line 23, the cited portion of which being incorporated herein by reference. Also suitable are ungelled polyepoxide-polyoxyalkylenepolyamine resins, such as are described in U.S. Pat. No. 4,432,850 at col. 2, line 60 to col. 5, line 58, the cited portion of which being incorporated herein by reference. In addition, cationic acrylic resins, such as those described in U.S. Pat. No. 3,455,806 at col. 2, line 18 to col. 3, line 61 and U.S. Pat. No. 3,928,157 at col. 2, line 29 to col. 3, line 21, these portions of both of which are incorporated herein by reference, may be used.

Besides amine salt group-containing resins, the cationic salt group-containing film-forming polymer may comprise a quaternary ammonium salt group-containing resin. As used herein, a "quaternary ammonium salt group" refers to a group comprising a quaternary ammonium cation of the formula $NR_4^+$, wherein each R group is independently an alkyl or aryl group, and a counter anion. Examples of these resins are those which are formed from reacting an organic polyepoxide with a tertiary amine acid salt. Such resins are described in U.S. Pat. No. 3,962,165 at col. 2, line 3 to col. 11, line 7; U.S. Pat. No. 3,975,346 at col. 1, line 62 to col. 17, line 25 and U.S. Pat. No. 4,001,156 at col. 1, line 37 to col. 16, line 7, these portions of which being incorporated herein by reference.

Examples of other suitable cationic resins include ternary sulfonium salt group-containing resins, such as those described in U.S. Pat. No. 3,793,278 at col. 1, line 32 to col. 5, line 20, this portion of which being incorporated herein by reference. Also, cationic resins which cure via a transesterification mechanism, such as described in European Patent Application No. 12463B1 at pg. 2, line 1 to pg. 6, line 25, this portion of which being incorporated herein by reference, may also be employed.

Other suitable cationic salt group-containing film-forming polymers include those that may form photodegradation resistant electrodepositable coating compositions. Such polymers include the polymers comprising cationic amine salt groups which are derived from pendant and/or terminal amino groups that are disclosed in U.S. Patent Application Publication No. 2003/0054193 A1 at paragraphs [0064] to [0088], this portion of which being incorporated herein by reference. Also suitable are the active hydrogen-containing, cationic salt group-containing resins derived from a polyglycidyl ether of a polyhydric phenol that is essentially free of aliphatic carbon atoms to which are bonded more than one aromatic group, which are described in U.S. Patent Application Publication No. 2003/0054193 A1 at paragraphs [0096] to [0123], this portion of which being incorporated herein by reference.

The active hydrogen-containing, cationic salt group-containing film-forming polymer may be made cationic and water dispersible by at least partial neutralization with an acid. Suitable acids include organic and inorganic acids. Non-limiting examples of suitable organic acids include formic acid, acetic acid, methanesulfonic acid, and lactic acid. Non-limiting examples of suitable inorganic acids include phosphoric acid and sulfamic acid. By "sulfamic acid" is meant sulfamic acid itself or derivatives thereof such as those having the formula:

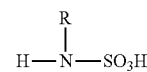

wherein R is hydrogen or an alkyl group having 1 to 4 carbon atoms. Mixtures of the above-mentioned acids also may be used in the present invention.

The extent of neutralization of the cationic salt group-containing film-forming polymer may vary with the particular polymer involved. However, sufficient acid should be used to sufficiently neutralize the cationic salt-group containing film-forming polymer such that the cationic salt-group containing film-forming polymer may be dispersed in an aqueous dispersing medium. For example, the amount of acid used may provide at least 20% of all of the total theoretical neutralization. Excess acid may also be used beyond the amount required for 100% total theoretical neutralization. For example, the amount of acid used to neutralize the cationic salt group-containing film-forming polymer may be ≥0.1% based on the total amines in the active hydrogen-containing, cationic salt group-containing film-forming polymer. Alternatively, the amount of acid used to neutralize the active hydrogen-containing, cationic salt group-containing film-forming polymer may be ≤100% based on the total amines in the active hydrogen-containing, cationic salt group-containing film-forming polymer. The total amount of acid used to neutralize the cationic salt group-containing film-forming polymer may range between any combination of values, which were recited in the preceding sentences, inclusive of the recited values. For example, the total amount of acid used to neutralize the active hydrogen-containing, cationic salt group-containing film-forming polymer may be 20%, 35%, 50%, 60%, or 80% based on the total amines in the cationic salt group-containing film-forming polymer.

According to the present invention, the cationic salt group-containing film-forming polymer may be present in the cationic electrodepositable coating composition in an amount of at least 40% by weight, such as at least 50% by weight, such as at least 60% by weight, and may be present in the in an amount of no more than 90% by weight, such as no more than 80% by weight, such as no more than 75% by weight, based on the total weight of the resin solids of the electrodepositable coating composition. The cationic salt group-containing film-forming polymer may be present in the cationic electrodepositable coating composition in an amount of 40% to 90% by weight, such as 50% to 80% by weight, such as 60% to 75% by weight, based on the total weight of the resin solids of the electrodepositable coating composition. As used herein, the "resin solids" include the ionic salt group-containing film-forming polymer, the curing agent (if present), and any additional water-dispersible non-pigmented component(s) present in the electrodepositable coating composition, and specifically excludes the electrically conductive particles.

According to the present invention, the ionic salt group containing film-forming polymer may comprise an anionic salt group containing film-forming polymer. As used herein, the term "anionic salt group containing film-forming polymer" refers to an anionic polymer comprising at least partially neutralized anionic functional groups, such as carboxylic acid and phosphoric acid groups that impart a negative charge. The anionic salt group-containing film-forming polymer may comprise active hydrogen functional groups. Anionic salt group-containing film-forming polymers that comprise active hydrogen functional groups may be referred to as active hydrogen-containing, anionic salt group-containing film-forming polymers. The anionic salt group containing film-forming polymer may be used in an anionic electrodepositable coating composition.

The anionic salt group-containing film-forming polymer may comprise base-solubilized, carboxylic acid group-containing film-forming polymers such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids, unsaturated carboxylic acid and at least one other ethylenically unsaturated monomer. Still another suitable anionic electrodepositable resin comprises an alkyd-aminoplast vehicle, i.e., a vehicle containing an alkyd resin and an amine-aldehyde resin. Another suitable anionic electrodepositable resin composition comprises mixed esters of a resinous polyol. Other acid functional polymers may also be used such as phosphatized polyepoxide or phosphatized acrylic polymers. Exemplary phosphatized polyepoxides are disclosed in U.S. Patent Application Publication No. 2009-0045071 at [0004]-[0015] and U.S. patent application Ser. No. 13/232,093 at [0014]-[0040], the cited portions of which being incorporated herein by reference. Also suitable are resins comprising one or more pendent carbamate functional groups, such as those described in U.S. Pat. No. 6,165,338.

According to the present invention, the anionic salt group-containing film-forming polymer may be present in the anionic electrodepositable coating composition in an amount of at least 50% by weight, such as at least 55% by weight, such as at least 60% by weight, and may be present in an amount of no more than 90% by weight, such as no more than 80% by weight, such as no more than 75% by weight, based on the total weight of the resin solids of the electrodepositable coating composition. The anionic salt group-containing film-forming polymer may be present in the anionic electrodepositable coating composition in an amount 50% to 90%, such as 55% to 80%, such as 60% to 75%, based on the total weight of the resin solids of the electrodepositable coating composition.

According to the present invention, the electrodepositable coating composition of the present invention may further comprise a curing agent. The curing agent may be reactive with the ionic salt group-containing film-forming polymer. The curing agent may react with the reactive groups, such as active hydrogen groups, of the ionic salt group-containing film-forming polymer to effectuate cure of the coating composition to form a coating. As used herein, the term "cure", "cured" or similar terms, as used in connection with the electrodepositable coating compositions described herein, means that at least a portion of the components that form the electrodepositable coating composition are cross-linked to form a coating. Additionally, curing of the electrodepositable coating composition refers to subjecting said composition to curing conditions (e.g., elevated temperature) leading to the reaction of the reactive functional groups of the components of the electrodepositable coating composition, and resulting in the crosslinking of the components of the composition and formation of an at least partially cured coating. Non-limiting examples of suitable curing agents are at least partially blocked polyisocyanates, aminoplast resins and phenoplast resins, such as phenolformaldehyde condensates including allyl ether derivatives thereof.

Suitable at least partially blocked polyisocyanates include aliphatic polyisocyanates, aromatic polyisocyanates, and mixtures thereof. The curing agent may comprise an at least partially blocked aliphatic polyisocyanate. Suitable at least partially blocked aliphatic polyisocyanates include, for example, fully blocked aliphatic polyisocyanates, such as those described in U.S. Pat. No. 3,984,299 at col. 1 line 57 to col. 3 line 15, this portion of which is incorporated herein by reference, or partially blocked aliphatic polyisocyanates that are reacted with the polymer backbone, such as is described in U.S. Pat. No. 3,947,338 at col. 2 line 65 to col. 4 line 30, this portion of which is also incorporated herein by reference. By "blocked" is meant that the isocyanate groups have been reacted with a compound such that the resultant blocked isocyanate group is stable to active hydrogens at ambient temperature but reactive with active hydrogens in the film forming polymer at elevated temperatures, such as between 90° C. and 200° C. The polyisocyanate curing agent may be a fully blocked polyisocyanate with substantially no free isocyanate groups.

The polyisocyanate curing agent may comprise a diisocyanate, higher functional polyisocyanates or combinations thereof. For example, the polyisocyanate curing agent may comprise aliphatic and/or aromatic polyisocyanates. Aliphatic polyisocyanates may include (i) alkylene isocyanates, such as trimethylene diisocyanate, tetramethylene diisocyanate, pentamethylene diisocyanate, hexamethylene diisocyanate ("HDI"), 1,2-propylene diisocyanate, 1,2-butylene diisocyanate, 2,3-butylene diisocyanate, 1,3-butylene diisocyanate, ethylidene diisocyanate, and butylidene diisocyanate, and (ii) cycloalkylene isocyanates, such as 1,3-cyclopentane diisocyanate, 1,4-cyclohexane diisocyanate, 1,2-cyclohexane diisocyanate, isophorone diisocyanate, methylene bis(4-cyclohexylisocyanate) ("HMDI"), the cyclo-trimer of 1,6-hexmethylene diisocyanate (also known as the isocyanurate trimer of HDI, commercially available as Desmodur N3300 from Convestro AG), and meta-tetramethylxylylene diisocyanate (commercially available as TMXDI® from Allnex SA). Aromatic polyisocyanates may include (i) arylene isocyanates, such as m-phenylene diisocyanate, p-phenylene diisocyanate, 1,5-naphthalene diisocyanate and 1,4-naphthalene diisocyanate, and (ii) alkarylene isocyanates, such as 4,4'-diphenylene methane ("MDI"), 2,4-tolylene or 2,6-tolylene diisocyanate ("TDI"), or mixtures thereof, 4,4-toluidine diisocyanate and xylylene diisocyanate. Triisocyanates, such as triphenyl methane-4, 4',4''-triisocyanate, 1,3,5-triisocyanato benzene and 2,4,6-triisocyanato toluene, tetraisocyanates, such as 4,4'-diphenyldimethyl methane-2,2',5,5'-tetraisocyanate, and polymerized polyisocyanates, such as tolylene diisocyanate dimers and trimers and the like, may also be used. The curing agent may comprise a blocked polyisocyanate selected from a polymeric polyisocyanate, such as polymeric HDI, polymeric MDI, polymeric isophorone diisocyanate, and the like. The curing agent may also comprise a blocked trimer of hexamethylene diisocyanate available as Desmodur N3300® from Covestro AG. Mixtures of polyisocyanate curing agents may also be used.

The polyisocyanate curing agent may be at least partially blocked with at least one blocking agent selected from a 1,2-alkane diol, for example 1,2-propanediol; a 1,3-alkane diol, for example 1,3-butanediol; a benzylic alcohol, for example, benzyl alcohol; an allylic alcohol, for example, allyl alcohol; caprolactam; a dialkylamine, for example dibutylamine; and mixtures thereof. The polyisocyanate curing agent may be at least partially blocked with at least one 1,2-alkane diol having three or more carbon atoms, for example 1,2-butanediol.

Other suitable blocking agents include aliphatic, cycloaliphatic, or aromatic alkyl monoalcohols or phenolic compounds, including, for example, lower (e.g. $C_1$-$C_6$) aliphatic alcohols, such as methanol, ethanol, and n-butanol; cycloaliphatic alcohols, such as cyclohexanol; aromatic-alkyl alcohols, such as phenyl carbinol and methylphenyl carbinol; and phenolic compounds, such as phenol itself and substituted phenols wherein the substituents do not affect coating operations, such as cresol and nitrophenol. Glycol ethers and glycol amines may also be used as blocking agents. Suitable glycol ethers include ethylene glycol butyl ether, diethylene glycol butyl ether, ethylene glycol methyl ether and propylene glycol methyl ether. Other suitable blocking agents include oximes, such as methyl ethyl ketoxime, acetone oxime and cyclohexanone oxime.

The curing agent may comprise an aminoplast resin. Aminoplast resins are condensation products of an aldehyde with an amino- or amido-group carrying substance. Condensation products obtained from the reaction of alcohols and an aldehyde with melamine, urea or benzoguanamine may be used. However, condensation products of other amines and amides may also be employed, for example, aldehyde condensates of triazines, diazines, triazoles, guanidines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, ammeline, 2-chloro-4,6-diamino-1,3,5-triazine, 6-methyl-2, 4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. Suitable aldehydes include formaldehyde, acetaldehyde, crotonaldehyde, acrolein, benzaldehyde, furfural, glyoxal and the like.

The aminoplast resins may contain methylol or similar alkylol groups, and at least a portion of these alkylol groups may be etherified by a reaction with an alcohol to provide organic solvent-soluble resins. Any monohydric alcohol may be employed for this purpose, including such alcohols as methanol, ethanol, propanol, butanol, pentanol, hexanol, heptanol and others, as well as benzyl alcohol and other aromatic alcohols, cyclic alcohol such as cyclohexanol, monoethers of glycols such as Cello-solves and Carbitols, and halogen-substituted or other substituted alcohols, such as 3-chloropropanol and butoxyethanol.

Non-limiting examples of commercially available aminoplast resins are those available under the trademark CYMEL® from Allnex Belgium SA/NV, such as CYMEL 1130 and 1156, and RESIMENE® from INEOS Melamines, such as RESIMENE 750 and 753. Examples of suitable aminoplast resins also include those described in U.S. Pat. No. 3,937,679 at col. 16, line 3 to col. 17, line 47, this portion of which being hereby incorporated by reference. As is disclosed in the aforementioned portion of the '679 patent, the aminoplast may be used in combination with the methylol phenol ethers.

Phenoplast resins are formed by the condensation of an aldehyde and a phenol. Suitable aldehydes include formaldehyde and acetaldehyde. Methylene-releasing and aldehyde-releasing agents, such as paraformaldehyde and hexamethylene tetramine, may also be utilized as the aldehyde agent. Various phenols may be used, such as phenol itself, a cresol, or a substituted phenol in which a hydrocarbon radical having either a straight chain, a branched chain or a cyclic structure is substituted for a hydrogen at the aromatic ring. Mixtures of phenols may also be employed. Some specific examples of suitable phenols are p-phenylphenol, p-tert-butylphenol, p-tert-amylphenol, cyclopentylphenol and unsaturated hydrocarbon-substituted phenols, such as the monobutenyl phenols containing a butenyl group in ortho, meta or para position, and where the double bond occurs in various positions in the hydrocarbon chain.

Aminoplast and phenoplast resins, as described above, are described in U.S. Pat. No. 4,812,215 at col. 6, line 20 to col. 7, line 12, the cited portion of which being incorporated herein by reference.

The curing agent may optionally comprise a high molecular weight volatile group. As used herein, the term "high molecular weight volatile group" refers to blocking agents and other organic byproducts that are produced and volatilized during the curing reaction of the electrodepositable coating composition during baking having a molecular weight of at least 70 g/mol, such as at least 125 g/mol, such as at least 160 g/mol, such as at least 195 g/mol, such as at least 400 g/mol, such as at least 700 g/mol, such as at least 1,000 g/mol, or higher, and may range from 70 to 1,000 g/mol, such as 160 to 1,000 g/mol, such as 195 to 1,000 g/mol, such as 400 to 1,000 g/mol, such as 700 to 1,000 g/mol. For example, the organic byproducts may include alcoholic byproducts resulting from the reaction of the film-forming polymer and an aminoplast or phenoplast curing agent, and the blocking agents may include organic compounds, including alcohols, used to block isocyanato groups that are unblocked during cure. For clarity, the high molecular weight volatile groups are covalently bound to the film-forming binder prior to cure, and explicitly exclude any organic solvents that may be present in the electrodepositable coating composition. The high molecular weight volatile group may improve the throw power of the electrodepositable coating composition. Without intending to be bound by any theory, it is believed that very conductive wet films lower the throw power of electrodepositable coatings. Throw power, the process of applying paint to areas that are not in the line of sight, is one well-known advantage of electrocoat. Consequently, the high electrically conductive particle content in the deposited electrocoat film may reduce throw power. However, a more resin rich formulation may allow for better throw power. One approach to address this challenge is depositing resins that have the high molecular weight volatile groups. Upon curing, the pigment-to-binder ratio of the deposited film can increase in the cured film relative to deposited uncured pigment to binder ratio in the electrodepositable coating composition because of the loss of a higher amount of the blocking agents and other organic products volatilized during cure. For example, if high molecular weight volatile groups comprise 45% of the weight of the binder upon cure, a deposited uncured film of 5:1 pigment-to-binder ratio will have a 9:1 pigment-to-binder ratio after cure. The higher the galvanically active particle content in the cured film relative to the amount of binder, the more likely that the galvanic protection will be improved. High molecular weight volatile groups may comprise 5% to 50% by weight of the film-forming binder, such as 7% to 45% by weight, such as 9% to 40% by weight, such as 11% to 35%, such as 13% to 30%, based on the total weight of the film-forming binder. The high molecular weight volatile groups and other lower molecular weight volatile organic compounds produced during cure, such as lower molecular weight blocking agents and organic byproducts produced during cure, may be present in an amount such that the relative weight loss of the film-forming binder deposited onto the substrate relative to the weight of the film-forming binder after cure is an amount of 5% to 50% by weight of the film-forming binder, such as 7% to 45% by weight, such as 9% to 40% by weight, such as 11% to 35%, such as 13% to 30%, based on the total weight of the film-forming binder before and after cure.

The curing agent may be present in the cationic electrodepositable coating composition in an amount of at least 10% by weight, such as at least 20% by weight, such as at least 25% by weight, and may be present in an amount of no more than 60% by weight, such as no more than 50% by weight, such as no more than 40% by weight, based on the total weight of the resin solids of the electrodepositable coating composition. The curing agent may be present in the cationic electrodepositable coating composition in an amount of 10% to 60% by weight, such as 20% to 50% by weight, such as 25% to 40% by weight, based on the total weight of the resin solids of the electrodepositable coating composition.

The curing agent may be present in the anionic electrodepositable coating composition in an amount of at least 10% by weight, such as at least 20% by weight, such as at least 25% by weight, and may be present in an amount of no more than 50% by weight, such as no more than 45% by weight, such as no more than 40% by weight, based on the total weight of the resin solids of the electrodepositable coating composition. The curing agent may be present in the anionic electrodepositable coating composition in an amount of 10% to 50% by weight, such as 20% to 45% by weight, such as 25% to 40% by weight, based on the total weight of the resin solids of the electrodepositable coating composition.

The film forming binder may also comprise polymeric materials that will decompose to constituent monomers under certain conditions. These species are called self-immolative polymers (SIP). The decomposition of these species may be facilitated by various mechanisms, including pH changes, exposure to (UV) light, redox processes, fluoride, etc. SIP function like "high molecular weight volatile groups" by enriching the P:B of a triggered film relative to an untriggered deposited film. As used herein, "a triggered film" is a film comprised of SIP that has been exposed to the trigger conditions required to mediate decomposition of the polymer. As used herein, "an untriggered film" is a film comprised of a SIP that has not been exposed to the trigger conditions required to mediate decomposition. An example of SIP is produced from the anionic polymerization of o-phthalaldehyde catalyzed by n-butyl lithium, which is then capped using t-butyldimethylsilylchloride (TBDS-Cl). The TBDS-capped poly(o-phthalaldehyde) will depolymerize when exposed to fluoride.

According to the present invention, the electrodepositable coating composition may also be substantially free, essentially free, or completely free of any of the ionic salt group-containing film-forming polymers or curing agents described above.

Further Components of the Electrodepositable Coating Compositions

The electrodepositable coating composition according to the present invention may optionally comprise one or more further components in addition to the electrically conductive particles and the film-forming binder described above.

According to the present invention, the electrodepositable coating composition may optionally comprise a catalyst to catalyze the reaction between the curing agent and the polymers. Examples of catalysts suitable for cationic electrodepositable coating compositions include, without limitation, organotin compounds (e.g., dibutyltin oxide and dioctyltin oxide) and salts thereof (e.g., dibutyltin diacetate); other metal oxides (e.g., oxides of cerium, zirconium and bismuth) and salts thereof (e.g., bismuth sulfamate and bismuth lactate); or a cyclic guanidine as described in U.S. Pat. No. 7,842,762 at col. 1, line 53 to col. 4, line 18 and col. 16, line 62 to col. 19, line 8, the cited portions of which being incorporated herein by reference. Examples of catalysts suitable for anionic electrodepositable coating compositions include latent acid catalysts, specific examples of which are identified in WO 2007/118024 at [0031] and include, but are not limited to, ammonium hexafluoroantimonate, quaternary salts of $SbF_6$ (e.g., NACURE® XC-7231), t-amine salts of $SbF_6$ (e.g., NACURE® XC-9223), Zn salts of triflic acid (e.g., NACURE® A202 and A218), quaternary salts of triflic acid (e.g., NACURE® XC-A230), and diethylamine salts of triflic acid (e.g., NACURE® A233), all commercially available from King Industries, and/or mixtures thereof. Latent acid catalysts may be formed by preparing a derivative of an acid catalyst such as para-toluenesulfonic acid (pTSA) or other sulfonic acids. For example, a well-known group of blocked acid catalysts are amine salts of aromatic sulfonic acids, such as pyridinium para-toluenesulfonate. Such sulfonate salts are less active than the free acid in promoting crosslinking. During cure, the catalysts may be activated by heating.

According to the present invention, the electrodepositable coating composition may comprise other optional ingredients, such as a pigment composition and/or various additives including fillers, plasticizers, anti-oxidants, biocides, UV light absorbers and stabilizers, hindered amine light stabilizers, defoamers, fungicides, dispersing aids, flow control agents, surfactants, wetting agents, pH adjusters, buffering agents, or combinations thereof. Alternatively, the electrodepositable coating composition may be completely free of any of the optional ingredients, i.e., the optional ingredient is not present in the electrodepositable coating composition. The pigment composition may comprise, for example, iron oxides, lead oxides, strontium chromate, coal dust, titanium dioxide, talc, barium sulfate, as well as color pigments such as cadmium yellow, cadmium red, chromium yellow and the like. The pigment content of the pigment composition, which excludes the electrically conductive particles described above, may be expressed as the pigment-to-binder weight ratio, and may be within the range of 0.03 to 0.1, when pigment is used. The other additives mentioned above may be present in the electrodepositable coating composition in amounts of 0.01% to 3% by weight, based on total weight of the resin solids of the electrodepositable coating composition.

According to the present invention, the electrodepositable coating composition optionally may comprise a rheology modifier. The rheology modifier may comprise one or more cellulose derivatives. The cellulose derivative may comprise any known in the art for modifying the rheology of electrodepositable coating compositions. For example, the cellulose derivative may comprise carboxymethylcellulose and salts thereof, microcrystalline cellulose, nanocrystalline cellulose, and other cellulose-based compounds. Non-limiting examples of suitable commercially available cellulose-based compounds include CRYSTO Cellulose, available from Renmatix, Inc., which is a highly crystalline cellulose derivative having a particle size ranging 0.5 to 1.5 m and provides properties of both microcrystalline cellulose and advanced nanocrystalline cellulose in parallel. The use of such cellulose derivatives may provide improved galvanic protection as evidenced by the increased appearance of white rust and reduced appearance of red rust in a scribed panel. The rheology modifier may comprise an alkali-swellable rheology modifier. Non-limiting examples of alkali-swellable rheology modifiers include alkali-swellable emulsions (ASE), hydrophobically modified alkali-swellable emulsions (HASE), ATRP star polymers, and other materials that provide pH-triggered rheological changes at low pH. Commercially available alkali-swellable rheology modifiers include alkali-swellable emulsions (ASE) such as ACRYSOL™ ASE60, hydrophobically modified alkali-swellable emulsions (HASE) such as ACRYSOL™ HASE TT-615, and ACRYSOL™ DR-180 HASE, each of which are available from the Dow Chemical Company, and ATRP star polymers such as fracASSIST® prototype 2. The ACRYSOL ASE alkali-swellable rheology modifiers comprise a copolymer comprising (meth)acrylic acid and an acrylate ester at a ratio of about 2:1 to 1:2, such as 1.5:1 to 1:1.5, such as about 1.1:1 to 1:1.1, such as about 1:1. The ACRYSOL HASE alkali-swellable rheology modifier comprise a tertiary polymer comprising the (meth)acrylic acid and acrylate ester copolymer used in the ASE family modified with a hydrophobic acrylic ester monomer. When the acid is un-neutralized at low pH, the rheology modifier is insoluble in water and does not thicken the composition, whereas when the acid is fully neutralized at higher pH values, the rheology modifier becomes soluble and thickens the composition. The rheology modifier may assist in preventing settling of the electrodepositable coating composition, and the rheology modifier may further improve the uniformity of an electrodeposited coating produced by electrodepositing the electrodepositable coating composition. For example, as shown in the examples below, use of the alkali-swellable rheology modifier rheology modifier may reduce the maximum settling rate of an electrodepositable coating composition by at least 10%, such as by at least 15%, such as at least 20%, such as at least 25%, such as at least 30%, such as at least 35%, compared to a comparative electrodepositable coating composition that does not include the rheology modifier. As used herein, the term "comparative coating composition" refers to electrodepositable coating compositions that do not include the rheology modifier and otherwise have similar amounts of components as the electrodepositable coating compositions of the present invention. In addition, as shown in the examples below, use of the alkali-swellable rheology modifier may provide for a difference in dry film thickness between the top center and bottom center of an electrodeposited panel to be less than 30%, such as less than 20%, such as less than 10%, such as less than 5%. The rheology modifier may be present in an amount of 0.5% to 15% by weight, such as 1% to 10% by weight, such as 2% to 8% by weight, such as 2.5% to 5% by weight, based on the total weight of the resin solids of the electrodepositable coating composition.

According to the present invention, the electrodepositable coating composition optionally may comprise a corrosion inhibitor. Corrosion inhibitors typically provide protection to a metal substrate either by reacting with the metal surface or interacting with the environment. Corrosion inhibitors generally fall under four classes defined by functionality, including: passivating inhibitors/anodic inhibitors, cathodic inhibitors, organic inhibitors, or volatile corrosion inhibitors. Passivating corrosion inhibitors cause a large anodic shift at the substrate surface by forcing the metal into the passivation range (usually by the formation of an oxide). Non-limiting examples of passivating corrosion inhibitors are nitrite, nitrate, chromate, molybdate, phosphate, and tungstate. Cathodic corrosion inhibitors reduce the rate of cathodic reaction or selectively precipitate to prevent diffusion of reducing species to the surface of the coating. Non-limiting examples of cathodic corrosion inhibitors are phosphates, silicates, calcium oxide, and magnesium oxide. Cathodic inhibitors may also scavenge oxygen as a mechanism to slow cathodic reaction, for example, sulfite and bisulfite. The third class are organic corrosion inhibitors which tend to function as both anodic and cathodic inhibitors. Mechanistically, they provide protection by physical adsorption, chemisorption, or film formation. Non-limiting examples of organic corrosion inhibitors are fatty acids, carboxylic acid, amines, amino acids, N-containing heterocycle, S-containing heterocycles, mercaptans, phosphate esters, phosphite ester, phosphonic acid, and phosphinic acids. Finally, volatile corrosion inhibitors are transported in a closed environment to the site of corrosion. They facilitate neutralization of acidic vapors or increase local pH to diminish the tendency of metal to corrode. Non-limiting examples of volatile corrosion inhibitors are hydrazine, morpholine, cyclohexylamine, and hexamethyleneamine. In the case of steel or iron substrates, the effectiveness of a corrosion inhibitor may be evaluated by analyzing the formation of red rust along the scribe of a scribed, coated panel. More red rust indicates more rusting of the underlying substrate whereas white rust indicates that the coating is oxidizing sacrificially relative to the underlying substrate. The use of corrosion inhibitors in the electrodepositable coating composition in the amounts disclosed herein may result in white rust present in the scribe in an amount of at least 50%, such as at least 60%, such as at least 75%, such as at least 85%, such as at least 95%, such as 100%, based upon the total of white rust and red rust in the scribe wherein the sum of white rust and red rust is equal to 100%. Corrosion inhibitors may be present in the electrodepositable coating composition in a concentration of 1 to 10,000 ppm, such as 5 to 5,000 ppm, such as 10 to 1,000 ppm, such as 50 to 750 ppm, such as 100 ppm to 500 ppm, based on the total weight of the electrodepositable coating composition.

According to the present invention, the electrodepositable coating composition comprises an aqueous dispersion medium comprising water and/or optionally one or more organic solvent(s). As used herein, the term "aqueous medium" refers to a liquid medium comprising more than 50% by weight water, based on the total weight of the aqueous medium. Such aqueous mediums may comprise less than 50% by weight organic solvent, or less than 40% by weight organic solvent, or less than 30% by weight organic solvent, or less than 20% by weight organic solvent, or less than 10% by weight organic solvent, or less than 5% by weight organic solvent, or less than 1% by weight organic solvent, less than 0.8% by weight organic solvent, or less than 0.1% by weight organic solvent, based on the total weight of the aqueous medium. Water comprises more than 50% by weight of the aqueous medium, such as at least 60% by weight, such as at least 70% by weight, such as at least 80% by weight, such as at least 85% by weight, such as at least 90% by weight, such as at least 95% by weight, such as at least 99% by weight, such as at least 99.9% by weight, such as 100% by weight, based on the total weight of the aqueous medium. Water may comprise 50.1% to 100% by weight, such as 70% to 100% by weight, such as 80% to 100% by weight, such as 85% to 100% by weight, such as 90% to 100% by weight, such as 95% to 100% by weight, such as 99% to 100% by weight, such as 99.9% to 100% by weight, based on the total weight of the aqueous medium. Water can for example be present in amounts of 40% to 90% by weight, such as 50% to 80% by weight, such as 60 to 75% by weight, based on total weight of the electrodepositable coating composition. Examples of suitable organic solvents include oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols. Examples of other at least partially water-miscible solvents include alcohols such as ethanol, isopropanol, butanol and diacetone alcohol. If used, the organic solvents may typically be present in an amount of less than 10% by weight, such as less than 5% by weight, based on total weight of the electrodepositable coating composition. The electrodepositable coating composition may in particular be provided in the form of a dispersion, such as an aqueous dispersion.

According to the present invention, the total solids content of the electrodepositable coating composition may be at least 1% by weight, such as at least 10% by weight, such as at least 20% by weight, and may be no more than 50% by weight, such as no more than 40% by weight, such as no more than 20% by weight, based on the total weight of the electrodepositable coating composition. The total solids content of the electrodepositable coating composition may be from 1% to 50% by weight, such as 10% to 40% by weight, such as 20% to 30% by weight, based on the total weight of the electrodepositable coating composition.

According to the present invention, the electrodepositable coating composition has a pH compatible with the galvanically active metal particles. The pH of the cationic electrodepositable coating composition of the present invention may be 7 to 11, such as 7 to 9, such as 7.5 to 8.5.

The pH of the anionic electrodepositable coating composition of the present invention may be 7 to 11, such as 7.5 to 10.5, such as 7.7 to 10, such as 8 to 9.

According to the present invention, the volume ratio of electrically conductive particles to binder may be at least 0.5:1, such as at least 1:1, such as at least 1.5:1, such as at least 1.7:1, such as at least 1.9:1, and may be no more than 3:1, such as no more than 2.5:1, such as no more than 2.3:1, such as no more than 2.1:1. The volume ratio of electrically conductive particles to binder may be 0.5:5 to 3:1, such as 1:1 to 3:1, such as 1.5:1 to 2.5:1, such as 1.7:1 to 2.3:1, such as 1.9:1 to 2.1:1. The volume ratio may be determined by methods known to those skilled in the art, and are measured at ambient temperature and pressure (about 23° C. and standard atmospheric pressure). For example, an uncured deposited coating may be dissolved in acetone and collected. The electrically conductive particles may be allowed to settle out of the suspension and the solution may be decanted with additional acetone used to wash the electrically conductive particles. The decanted solution and wash solution may be dried to determine the weight of polymer present in the coating, and the electrically conductive particles may be dried to determine the weight of electrically conductive particles present. The weight ratio may then be determined and converted into a volume ratio based upon the density of the polymer and the electrically conductive particles.

According to the present invention, when the electrically conductive particles comprise aluminum particles, the weight ratio of aluminum particles to binder may be at least 3:1, such as at least 3.5:1, such as at least 3.8:1, and may be no more than 6.75:1, such as no more than 4.5:1, such as no more than 4.1:1. The weight ratio of aluminum particles to binder may be 3:1 to 6.75:1, such as 3.5:1 to 4.5:1, such as 3.8:1 to 4.1:1.

According to the present invention, when the electrically conductive particles comprise zinc particles, the weight ratio of zinc particles to binder may be at least 2:1, such as at least 2.5:1, such as at least 2.75:1, such as at least 3:1, such as at least 6:1, such as at least 8:1, such as at least 8.5:1, such as at least 9:1, and may be no more than 18:1, such as no more than 12:1, such as no more than 11:1, such as no more than 10:1, such as no more than 9.5:1, such as no more than 9.25:1. The weight ratio of zinc particles to binder may be 2:1 to 18:1, such as 2.5:1 to 12:1, such as 2.75:1 to 10:1, such as 3:1 to 9.5:1, such as 6:1 to 9.25:1, such as 6:1 to 18:1, such as 8:1 to 11:1, such as 8.5:1 to 9.5:1.

According to the present invention, the electrodepositable coating composition of the present invention may be substantially free, essentially free, or completely free of lithium-containing compounds. As used herein, lithium-containing compounds refers to compounds or complexes that comprise lithium, such as, for example, $LiCoO_2$, $LiNiO_2$, $LiFePO_4$, $LiCoPO_4$, $LiMnO_2$, $LiMn_2O_4$, $Li(NiMnCo)O_2$, and $Li(NiCoAl)O_2$. As used herein, an electrodepositable coating composition is "substantially free" of lithium-containing compounds if lithium-containing compounds are present in the electrodepositable coating composition in an amount of less than 1% by weight, based on the total solids weight of the composition. As used herein, an electrodepositable coating composition is "essentially free" of lithium-containing compounds if lithium-containing compounds are present in the electrodepositable coating composition in an amount of less than 0.1% by weight, based on the total solids weight of the composition. As used herein, an electrodepositable coating composition is "completely free" of lithium-containing compounds if lithium-containing compounds are not present in the electrodepositable coating composition, i.e., <0.001% by weight, based on the total solids weight of the composition.

According to the present invention, the electrodepositable coating composition may be substantially free, essentially free, or completely free of an alkaline earth metal compound. As used herein, an alkaline earth metal compound refers to compounds that comprise an alkaline earth metal in the +2 oxidation state and specifically excludes metals comprising elemental (zerovalent) alkaline earth metal. The alkaline earth metal compound may comprise beryllium, magnesium, calcium, strontium, barium, or combinations thereof. The alkaline earth metal compound may be an oxide, carbonate, hydroxide, phosphate or oxalate of an alkaline earth metal. For example, the alkaline earth metal may comprise magnesium and the alkaline earth metal compound may comprise magnesium oxide, magnesium carbonate, magnesium hydroxide, magnesium phosphate, magnesium oxalate, or combinations thereof. For example, the alkaline earth metal may comprise calcium and the alkaline earth metal compound may comprise calcium oxide, calcium carbonate, calcium hydroxide, calcium phosphate, calcium oxalate, or combinations thereof. As used herein, an electrodepositable coating composition is substantially free of an alkaline earth metal compound if alkaline earth metal compound is present in an amount of less than 0.5% by weight, based on the total solids weight of the composition. As used herein, an electrodepositable coating composition is essentially free of an alkaline earth metal compound if alkaline earth metal compound is present in an amount of less than 0.1% by weight, based on the total solids weight of the composition. As used herein, an electrodepositable coating composition is completely free of an alkaline earth metal compound if alkaline earth metal compound is not present in the electrodepositable coating composition, i.e., 0.00% by weight, based on the total solids weight of the composition.

Methods of Coating and Coated Substrates

The present invention is also directed to methods for coating a substrate. The electrodepositable coating composition may be electrophoretically deposited upon any electrically conductive substrate. Suitable substrates include metal substrates, metal alloy substrates, and/or substrates that have been metallized, such as nickel-plated plastic. Additionally, substrates may comprise non-metal conductive materials including composite materials such as, for example, materials comprising carbon fibers or conductive carbon. According to the present invention, the metal or metal alloy may comprise cold rolled steel, hot rolled steel, steel coated with zinc metal, zinc compounds, or zinc alloys, such as electrogalvanized steel, hot-dipped galvanized steel, galvanealed steel, and steel plated with zinc alloy. Aluminum alloys of the 2XXX, 5XXX, 6XXX, or 7XXX series as well as clad aluminum alloys and cast aluminum alloys of the A356 series also may be used as the substrate. Magnesium alloys of the AZ31B, AZ91C, AM60B, or EV31A series also may be used as the substrate. The substrate used in the present invention may also comprise titanium and/or titanium alloys. Other suitable non-ferrous metals include copper and magnesium, as well as alloys of these materials. Suitable metal substrates for use in the present invention include those that are often used in the assembly of vehicular bodies (e.g., without limitation, door, body panel, trunk deck lid, roof panel, hood, roof and/or stringers, rivets, landing gear components, and/or skins used on an aircraft), a vehicular frame, vehicular parts, motorcycles, wheels, industrial structures and components such as appliances, including washers, dryers, refrigerators, stoves, dishwashers, and the like, agricultural equipment, lawn and garden equipment, air conditioning units, heat pump units, lawn furniture, and other articles. As used herein, "vehicle" or variations thereof includes, but is not limited to, civilian, commercial and military aircraft, and/or land vehicles such as cars, motorcycles, and/or trucks. The metal substrate also may be in the form of, for example, a sheet of metal or a fabricated part. It will also be understood that the substrate may be pretreated with a pretreatment solution including a zinc phosphate pretreatment solution such as, for example, those described in U.S. Pat. Nos. 4,793,867 and 5,588,989, or a zirconium-containing pretreatment solution such as, for example, those described in U.S. Pat. Nos. 7,749,368 and 8,673,091.

Additional film-forming compositions may be used to treat the substrate prior to electrodeposition include other metal-rich coating compositions. Such coating composition may allow for the improvement of the throw power of the electrodepositable coating composition of the present invention. For example, a first coating composition having a relatively lower amount of metal content such as a pigment-to-binder ratio of about 3:1, such as 1:1 to 5:1, such as 2:1 to 4:1, may be applied prior to the electrodepositable coating composition of the present invention. The first coating composition will have enough conductivity to maintain conductivity with the electrodepositable coating composition of the present invention while allowing the electrodepositable coating composition to be deposited with improved throw power. Such metal-rich coating composition may be applied to the substrate by any of a variety of known techniques, such as dipping or immersion, spraying, intermittent spraying, dipping followed by spraying, spraying followed by dipping, drawdown, brushing, roll-coating, or the like, and may be applied by electrodeposition. Alternatively, the first coating may have a pigment-to-binder ratio greater than the electrodepositable coating composition. Such coating composition may be applied by any means known in the art, such as dipping or immersion, spraying, intermittent spraying, dipping followed by spraying, spraying followed by dipping, brushing, roll-coating, or the like, as well as electrodeposition. The pigment to binder ratio of the first composition may be from 6:1 to 11:1, such as from 7:1 to 10:1, such as 8:1 to 9.5:1.

According the present invention, such method may comprise electrophoretically applying an electrodepositable coating composition as described above to at least a portion of the substrate and curing the coating composition to form an at least partially cured coating on the substrate. According to the present invention, the method may comprise (a) electrophoretically depositing onto at least a portion of the substrate an electrodepositable coating composition of the present invention and (b) heating the coated substrate to a temperature and for a time sufficient to cure the electrodeposited coating on the substrate. According to the present invention, the method may optionally further comprise (c) electrophoretically depositing a second electrodepositable coating composition onto at least a portion of the substrate coated with the electrodepositable coating composition of the present invention and (d) heating the coated substrate of step (c) to a temperature and for a time sufficient to at least cure the electrodepositable coating composition. The second electrodepositable coating composition may be a conventional electrodepositable coating composition comprising primarily organic binder material, such as the binder materials disclosed herein, or a second metal-rich electrodepositable coating composition. Optionally, the second electrodepositable coating composition of step (c) may be applied to the substrate prior to curing the coated substrate of step (a). According to the present invention, alternatively or in addition to, the method may optionally further comprise (e) applying directly to the at least partially cured electrodeposited coating of step (a) or (c) one or more pigment-containing coating compositions and/or one or more pigment-free coating compositions to form a top coat over at least a portion of the at least partially cured electrodeposited coating, and (f) heating the coated substrate of step (e) to a temperature and for a time sufficient to cure the top coat.

According to the present invention, the method may optionally comprise a cleaning step prior to depositing the electrodepositable coating composition onto the substrate. The substrate may be cleaned by contacting the substrate with a caustic cleaning solution, rinsing the substrate with deionized water, and drying the substrate. The caustic cleaning solution may comprise, for example, 50 mL of Chemkleen 2010 LP (a phosphate-free alkaline cleaner available from PPG), 5 mL of Chemkleen 181 ALP (a phosphate-free blended surfactant additive, available from PPG) and 3,750 mL of deionized water. Optionally, the cleaning solution may be heated. An exemplary method of cleaning the substrate comprises spray cleaning the substrate with the above described cleaner heated to 120° F. for 120 seconds, rinsing the panel for 30 seconds with deionized water, and immediately drying the substrate with warm air. The cleaned substrate may be kept in a desiccator until immediately before use.

According to the present invention, the cationic electrodepositable coating composition of the present invention may be deposited upon an electrically conductive substrate by placing the electrodepositable coating composition in contact with an electrically conductive cathode and an electrically conductive anode, with the surface to be coated being the cathode. Following contact with the composition, an adherent film of the coating composition is deposited on the cathode when a sufficient voltage is impressed between the electrodes. The conditions under which the electrodeposition is carried out are, in general, similar to those used in electrodeposition of other types of coatings. The applied voltage may be varied and can be, for example, as low as one volt to as high as several thousand volts, such as between 50 and 500 volts. The current density may be between 0.5 ampere and 15 amperes per square foot.

Once the cationic electrodepositable coating composition is electrodeposited over at least a portion of the electroconductive substrate, the coated substrate is heated to a temperature and for a time sufficient to cure the electrodeposited coating on the substrate. The coated substrate may be heated to a temperature ranging from 250° F. to 450° F. (121.1° C. to 232.2° C.), such as from 275° F. to 400° F. (135° C. to 204.4° C.), such as from 300° F. to 360° F. (149° C. to 180° C.). The curing time may be dependent upon the curing temperature as well as other variables, for example, the film thickness of the electrodeposited coating, level and type of catalyst present in the composition, type of curing agent employed, and the like. For purposes of the present invention, all that is necessary is that the time be sufficient to effect cure of the coating on the substrate. For example, the curing time can range from 10 minutes to 60 minutes, such as 20 to 40 minutes. As the resulting coating is electrically conductive, thicker coatings may be achieved than conventional electrodepositable coating compositions that form an insulating coating, with the thickness limited more by practical considerations than coating limitations. For example, the thickness of the resultant cured electrodeposited coating may range from 15 to 80 microns, such as 20 to 75 microns, such as 25 to 50 microns.

According to the present invention, the anionic electrodepositable coating composition of the present invention may be deposited upon an electrically conductive substrate by placing the electrodepositable coating composition in contact with an electrically conductive cathode and an electrically conductive anode, with the surface to be coated being the anode. Following contact with the composition, an adherent film of the coating composition is deposited on the anode when a sufficient voltage is impressed between the electrodes. The conditions under which the electrodeposition is carried out are, in general, similar to those used in electrodeposition of other types of coatings. The applied voltage may be varied and can be, for example, as low as one volt to as high as several thousand volts, such as between 50 and 500 volts. The current density may be between 0.5 ampere and 15 amperes per square foot.

Once the anionic electrodepositable coating composition is electrodeposited over at least a portion of the electroconductive substrate, the coated substrate may be heated to a temperature and for a time sufficient to cure the electrodeposited coating on the substrate. The coated substrate may be heated to a temperature ranging from 200° F. to 450° F. (93° C. to 232.2° C.), such as from 275° F. to 400° F. (135° C. to 204.4° C.), such as from 300° F. to 360° F. (149° C. to 180° C.). The curing time may be dependent upon the curing temperature as well as other variables, for example, film thickness of the electrodeposited coating, level and type of catalyst present in the composition and the like. For purposes of the present invention, all that is necessary is that the time be sufficient to effect cure of the coating on the substrate. For example, the curing time may range from 10 to 60 minutes, such as 20 to 40 minutes. The thickness of the resultant cured electrodeposited coating may range from 15 to 80 microns, such as 20 to 75 microns, such as 25 to 50 microns.

According to the present invention, once the anionic or cationic coating composition is electrodeposited over a portion of the electroconductive substrate, the method of the present invention may further comprise heating the coated substrate to a temperature and for a time such that at least a portion of the binder present in the coating undergoes pyrolysis, i.e., decomposes, and may be subjected to a temperature and for a time that substantially all of the binder undergoes pyrolysis. The temperature and time necessary for the binder to undergo pyrolysis will be dependent upon the binder used, but may be at least 400° F. (204° C.), such as at least 450° F. (232° C.). The heating temperature upper limit corresponds to the melting point at which the electrically conductive particles, or underlying substrate, will melt. For example, the heating temperature may be no more than 2,000° F. (1,093° C.), such as no more than 1,300° F. (704° C.), such as no more than 800° F. (427° C.).

The present invention is further directed to a coating formed by at least partially curing the electrodepositable coating composition described herein. The coating may optionally be subjected to temperature and times such that at least a portion of the binder undergoes pyrolysis, as discussed above.

The present invention is further directed to a substrate that is coated, at least in part, with the electrodepositable coating composition described herein in an at least partially cured state. The coating may optionally be subjected to heating to a temperature such that at least a portion of the binder undergoes pyrolysis, as discussed above.

The method of the present invention may optionally further comprise contacting the substrate with a metallic conditioning composition after the substrate is cleaned and degreased and before any pretreatment or the electrodepositable coating composition is applied to the substrate. As used herein, a "metallic conditioning composition" (MCC) is defined as surface treatment composition that comprises metal salts of nickel, copper, cobalt, tin, indium, molybdenum, tungsten, and/or silver. After contacting the cleaned substrate with the metallic conditioning composition, the metal ion(s) present in that composition will deposit onto the cleaned substrate in either metallic form (M) or a reduced form ($M^{n-1}$) compared to the oxidation state of that metal ion ($M^{n+}$) as supplied in the metallic conditioning composition. For example, copper is supplied as 2+ ions in the metallic conditioning composition, and upon contacting the substrate surface, the copper will be reduced to either $Cu^0$ or $Cu^{1+}$ during the deposition process. The exact oxidation of the deposited material depends upon the application conditions. The deposition of nickel, copper, cobalt, tin, indium, molybdenum, tungsten, and/or silver onto a clean substrate by the metallic conditioning composition prior to pretreatment or electrocoat may improve adhesion of a subsequent pretreatment layer (if present) and the electrodepositable coating composition layer to the substrate. The concentration of nickel, copper, cobalt, tin, indium, molybdenum, tungsten, and/or silver in the metallic conditioning composition may be from 10 to 20,000 ppm, such as 5 to 10,000 ppm, such as 20 to 8,000 ppm. The metallic conditioning composition may be brought into contact with the substrate by any of a variety of known techniques, such as dipping or immersion, spraying, intermittent spraying, dipping followed by spraying, spraying followed by dipping, brushing, roll-coating, or the like.

The method of the present invention may optionally further comprise contacting the substrate with a sealing composition after the electrodepositable coating composition is applied to the substrate and prior to any subsequent baking step. As used herein, a "sealing composition" refers to a composition, e.g. a solution or dispersion, that affects a material deposited onto a substrate in such a way as to alter its physical and/or chemical properties, such as, for example, improved corrosion protection or adhesion of subsequently applied coating layers. The sealing composition may comprise phosphonic acids or carbonate salts, such as lithium, sodium, potassium and/or ammonium carbonates. When present, phosphonic acid may be present in an amount of 10 to 25,000 ppm, such as 50 to 10,000 ppm, such as 100 to 5,000 ppm, such as 150 to 3,000 ppm, based on the total weight of the sealing composition. When present, carbonate salts may be present in an amount of 10 to 25,000 ppm, such as 50 to 10,000 ppm, such as 100 to 5,000 ppm, such as 150 to 3,000 ppm, based on the total weight of the sealing composition. The sealing composition may be brought into contact with the substrate by any of a variety of known techniques, such as dipping or immersion, spraying, intermittent spraying, dipping followed by spraying, spraying followed by dipping, brushing, roll-coating, or the like.

The coating may comprise, consist essentially of, or consist of the binder and electrically conductive particles. The volume and weight ratios of electrically conductive particles to binder may be the same as the volume and weight ratios of the electrodepositable coating composition from which they are deposited. However, the binder or electrically conductive particles may preferentially deposit onto the substrate over the other such that the resulting coating comprises a greater or lesser ratio of electrically conductive particles to binder than the coating composition itself. Additionally, as discussed above, the substrate may be heated to a temperature and for a time that at least a portion of the binder undergoes pyrolysis. Accordingly, the volume and weight ratios of the electrically conductive particles to binder of the coating will be greater than that of the coating composition from which it was deposited. If the substrate is heated to a temperature and for at time such that substantially all of the binder undergoes pyrolysis, the coating may comprise, consist essentially of, or consist of the electrically conductive particles, and the binder may be present in an amount of less than 5% by weight, such as less than 1% by weight, such as less than 0.1% by weight, based on the total weight of the coating.

According to the present invention, the coating resulting from the coating composition of the present invention may provide galvanic protection to the underlying substrate. For example, the coating may corrode in a sacrificial way that protects the underlying substrate. The galvanic protection may be demonstrated by the presence of white corrosion products and/or the absence of red corrosion products following 500 hours salt spray testing according to ASTM B117. The galvanic protection may also be demonstrated by the presence of white corrosion products and/or the absence of red corrosion products following 20 cycles according to SAE J2334 cyclic corrosion testing. The galvanic protection may be further demonstrated by the presence of white corrosion products and/or the absence of red corrosion products following 20 cycles according to GMW14872 cyclic corrosion testing. The white corrosion products indicate that sacrificial oxidation of the coating while red corrosion products indicate corrosion of the underlying substrate.

According to the present invention, the coating resulting from the coating composition of the present invention may be an electroconductive coating.

As used herein, unless otherwise defined herein, the term "substantially free" means the ingredient is present in an amount of 1% by weight or less, based on the total weight of the coating composition.

As used herein, unless otherwise defined herein, the term "essentially free" means the ingredient is present in an amount of 0.1% by weight or less, based on the total weight of the coating composition.

As used herein, unless otherwise defined herein, the term "completely free" means the ingredient is not present in the coating composition, i.e., 0.00% by weight, based on the total weight of the coating composition.

For purposes of the detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "a" film-forming binder, "an" electrically conductive particle, and "a" curing agent, a combination (i.e., a plurality) of these components can be used. In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, an electrodepositable coating composition "deposited onto" a substrate does not preclude the presence of one or more other intervening coating layers of the same or different composition located between the electrodepositable coating composition and the substrate.

Whereas specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

Aspects

1. An electrodepositable coating composition comprising:
a film-forming binder; and
electrically conductive particles;
wherein the electrically conductive particles are present in an amount of at least 25% by weight, based on the total solids weight of the electrodepositable coating composition.
2. The electrodepositable coating composition of Aspect 1, wherein the electrically conductive particles comprise a galvanically active metal particle.
3. The electrodepositable coating composition of Aspects 1 or 2, wherein the electrically conductive particles comprise, consist essentially of, or consist of zinc, aluminum, magnesium, zinc/aluminum alloy, zinc/tin alloy, or combinations thereof.
4. The electrodepositable coating composition of Aspects 2 or 3, wherein the electrically conductive particles further comprise non-metal conductive particles.
5. The electrodepositable coating composition of Aspect 1, wherein the electrically conductive particles comprise non-metal conductive particles.
6. The electrodepositable coating composition of Aspects 4 or 5, wherein the non-metal conductive particles comprise, consist essentially of, or consist of conductive carbon, carbon black, carbon nanotubes, graphene, some forms of graphene oxide, carbon fibers, fullerenes and the like, conductive silica, or combinations thereof.
7. The electrodepositable coating composition of any of the preceding Aspects, wherein the electrically conductive particles comprise, consist essentially of, or consist of surface treated conductive particles.
8. The electrodepositable coating composition of Aspect 7, wherein the surface treated conductive particles are surface treated with surface treatment dispersant molecules comprising a reactive group and a tail group, the reactive group comprising a silane, a carboxylic acid, a phosphonic acid, or a quaternary ammonium group.
9. The electrodepositable coating composition of any of Aspects 1-4 or 7-8, wherein the electrically conductive particle comprises zinc.
10. The electrodepositable coating composition of any of Aspects 1-4 or 7-9, wherein the electrically conductive particle comprises, consists essentially of, or consists of a zinc particle surface treated with a silane, wherein the silane comprises a polyether-functional alkoxysilane.
11. The electrodepositable coating composition of any of Aspects 1-4 or 7-10, wherein the electrically conductive particle comprises, consists essentially of, or consists of zinc particles, and the composition has a zinc particle to binder weight ratio of at least 2:1.
12. The electrodepositable coating composition of any of Aspects 1-4 or 7-8, wherein the electrically conductive particle comprises, consists essentially of, or consists of aluminum particles, and the composition has an aluminum particle to binder weight ratio of at least 3:1.
13. The electrodepositable coating composition of any of the preceding Aspects, wherein the film-forming binder comprises an ionic salt group-containing, film-forming polymer.
14. The electrodepositable coating composition of any of the preceding Aspects, wherein the film-forming binder comprises a cationic salt group-containing, film-forming polymer, wherein the cationic salt group-containing, film-forming polymer comprises an alkyd, acrylic, polyepoxide, polyamide, polyurethane, polyurea, polyether, or polyester polymer or wherein the film-forming binder comprises an anionic salt group-containing, film-forming polymer, wherein the anionic salt group containing film-forming polymer comprises phosphatized polyepoxide or phosphatized acrylic polymers.

15. The electrodepositable coating composition of any of the preceding Aspects, wherein the binder further comprises a curing agent, wherein the curing agent comprises, consists essentially of, or consists of an at least partially blocked polyisocyanate, an aminoplast resin, a phenoplast resin, or combinations thereof.

16. The electrodepositable coating composition of Aspect 15, wherein the curing agent comprises high molecular weight volatile groups.

17. The electrodepositable coating composition of Aspect 16, wherein the high molecular weight volatile groups comprise 5% to 50% by weight of the film-forming binder, such as 7% to 45% by weight, such as 9% to 40% by weight, such as 11% to 35%, such as 13% to 30%, based on the total weight of the film-forming binder.

18. The electrodepositable coating composition of any of the preceding Aspects, wherein a relative weight loss of the film-forming binder deposited onto a substrate relative to the weight of the film-forming binder after cure of the coating is an amount of 5% to 50% by weight of the film-forming binder, such as 7% to 45% by weight, such as 9% to 40% by weight, such as 11% to 35%, such as 13% to 30%, based on the total weight of the film-forming binder before cure.

19. The electrodepositable coating composition of any of the preceding Aspects, wherein the film-forming binder comprises, consists essentially of, or consists of self-immolative polymers.

20. The electrodepositable coating composition of any of the preceding Aspects, further comprising a rheology modifier.

21. The electrodepositable coating composition of Aspect 20, wherein the rheology modifier comprises an alkali-swellable rheology modifier.

22. The electrodepositable coating composition of any of the preceding Aspects, further comprising a corrosion inhibitor.

23. The electrodepositable coating composition of any of the preceding Aspects, wherein the electrodepositable coating composition is substantially free, essentially free, or completely free of lithium-containing particles.

24. The electrodepositable coating composition of any of the preceding Aspects, wherein the electrodepositable coating composition is substantially free, essentially free, or completely free of an alkaline earth metal compound.

25. An electrodepositable coating composition comprising a film-forming binder; and electrically conductive particles; wherein the electrically conductive particles to binder volume ratio is 0.5:1 to 3:1, wherein the coating composition comprises a coating composition according to any of the preceding Aspects.

26. A method of coating a substrate, the method comprising electrophoretically applying the electrodepositable coating composition of any of the preceding Aspects to the substrate to form a coating.

27. The method of Aspect 26, wherein the method further comprises subjecting the coating to curing conditions sufficient to at least partially cure the coating.

28. The method of Aspect 27, wherein the curing conditions comprise heating the substrate.

29. The method of Aspect 28, wherein heating the substrate comprises heating the substrate to a temperature wherein at least a portion of the binder undergoes pyrolysis.

30. The method of Aspect 27 or 28, wherein the coating comprises less than 5% by weight of the binder, based on the total weight of the cured coating.

31. The method of any of Aspects 26-30, further comprising contacting the substrate with a sealing composition after the electrodepositable coating composition is electrophoretically applied to the substrate.

32. The method of any of Aspects 26-31, further comprising contacting the substrate with a metallic conditioning composition before the electrodepositable coating composition is electrophoretically applied to the substrate.

33. The method any of Aspects 26-32, further comprising applying a film-forming composition having a pigment-to-binder ratio greater than the pigment-to-binder ratio of the electrodepositable coating composition prior to electrophoretically applying the electrodepositable coating composition.

34. An at least partially coated substrate coated by the method of any of Aspects 26-33.

35. The coated substrate of Aspect 34, wherein the coated substrate has white corrosion products following 500 hours salt spray testing according to ASTM B117 and/or following 20 cycles according to SAE J2334 cyclic corrosion testing.

36. The coated substrate of Aspects 34 or 35, wherein the film-forming binder comprises an anionic salt group containing film-forming polymer, and the coated substrate has white corrosion products following 20 cycles according to GMW14872 cyclic corrosion testing.

37. The coated substrate of any of Aspects 34-36, wherein the coated substrate has an electrical conductance of at least $1 \times 10^5$ S/m and/or an electrical resistance of no more than $6.3 \times 10^7$ S/m.

38. Use of an electrodepositable coating composition according to any of Aspects 1-25 for forming a primer coating in a method according to any of Aspects 26-37.

Illustrating the invention are the following examples, which, however, are not to be considered as limiting the invention to their details. Unless otherwise indicated, all parts and percentages in the following examples, as well as throughout the specification, are by weight.

EXAMPLES

Example 1—Preparation of a Cationic Resin

TABLE 1

| Charge | Ingredient | Amount (g) |
|---|---|---|
| 1 | Dowanol PM | 272.6 |
|   | Propasol B | 177.4 |
| 2 | Styrene | 412.8 |
|   | Butyl Acrylate | 1152.0 |
|   | Hydroxyethyl Acrylate | 201.6 |
|   | Glycidyl Methacrylate | 153.6 |
|   | Luperox 575 | 86.4 |
|   | Dowanol PM | 205.3 |
| 3 | Luperox 575 | 9.8 |
|   | Dowanol PM | 13.1 |
| 4 | Dimethylaminoethanol | 86.7 |
|   | 88% Lactic Acid | 94.5 |
|   | Deionized Water | 175.0 |
| 5 | Propasol B | 82.2 |

A cationic resin film-forming binder was prepared according to the following procedure using the ingredients listed in Table 1. The first charge of Dowanol PM and Propasol B were added to a four-neck five-liter flask equipped with mechanical stirrer, thermocouple and condenser and heated to reflux at 115° C. The second charge consisting of a mixture the monomers, the first quantity of Luperox initiator and the second quantity of Dowanol PM solvent was added dropwise over three hours to the refluxing mixture in the flask while maintaining a temperature of 115 to 120° C. Upon completion of the addition, the mixture was held an additional 30 minutes at temperature whereupon half of a mixture prepared from the second quantity of Luperox initiator and the third quantity of Dowanol PM were added dropwise to the flask over 10 minutes and the mixture held at 115 to 120° C. for an hour. At the end of the hour's hold, the process was repeated using the second half of the initiator Dowanol PM mixture. At the end of the second hour's initiator hold, the mixture was cooled to 90° C. before going on. When the temperature was reached, a mixture consisting of the dimethylaminoethanol, 88% lactic acid and deionized water was added dropwise over 10 minutes to the flask with good mixing and the reaction mixture held at 90° C. for an additional two hours. At that point, the mixture was cooled to 80° C. and diluted with the final charge of Propasol B to give the cationic resin a solids content of 70%.

Example 2—Preparation of a Blocked Polyisocyanate Crosslinker

TABLE 2

| Ingredient | Amount (g) |
| --- | --- |
| Isophorone Diisocyanate | 500.0 |
| Methyl propyl ketone | 46.7 |
| Dibutyltin dilaurate | 0.8 |
| Butyl Cellosolve | 292.1 |
| Dibutyltin dilaurate | 0.8 |
| Trimethylolpropane | 92.4 |
| Dowanol PPh | 215.0 |
| Dowanol PM | 116.2 |

A blocked polyisocyanate crosslinker was prepared according to the following procedure using the ingredients listed in Table 2. The isophorone diisocyanate, methyl propyl ketone and first quantity dibutyltin dilaurate were added to a four-neck two-liter flask equipped with mechanical stirrer, thermocouple and condenser under nitrogen. The butyl cellosolve was added dropwise with good stirring at such a rate as to keep the reaction mixture from exceeding 52° C. Upon completion of the addition, the mixture was held at 65° C. for 30 minutes and sampled for isocyanate equivalent weight. If the equivalent weight was less than the theoretical 391, the mixture was held an additional 30 minutes at 65° C. or until the isocyanate equivalent weight was 391 or more. The second quantity of dibutyltin dilaurate was then added followed by the trimethylolpropane in three equal portions with 30-minute holds after each addition at 75° C. After the last trimethylolpropane addition, the mixture was held at 75° C. until the isocyanate peak disappeared in the infrared spectrum. The mixture was then diluted with the Dowanol PPh and Dowanol PM to give a 70.1% solids solution of the blocked isocyanate crosslinker.

Example 3—Preparation of Treated Zinc Dust

A surface-treated zinc dust was prepared according to the following procedure. 750 grams of UltraPure #4 zinc dust (available from Purity Zinc Metals) was added to a quart glass container. 300 grams methyl isobutyl ketone was added to the quart glass container and the blend was placed under mechanical mixing. After the zinc was completely wetted, 7.5 grams of DYNASYLAN 4148 (polyethylene glycol functional alkoxysilane available from Evonik Industries) was added dropwise to the blend. 1.0 g deionized water was then added to the blend dropwise. The mix was allowed to stir overnight at room temperature. The methyl isobutyl ketone was then removed from the treated zinc using a Buchner funnel and vacuum pump. The treated zinc dust was placed in an aluminum pan and air dried in a hood overnight.

Example 4—Preparation of a Cationic Zinc-Rich Electrodepositable Coating Composition

TABLE 3

| Ingredient | Description | Amount (g) |
| --- | --- | --- |
| 1 | Deionized water | 82.8 |
| 2 | Cationic Resin of Example 1 | 26.0 |
| 3 | Blocked Isocyanate of Example 2 | 14.0 |
| 4 | Treated Zinc Dust from Example 3 | 252.0 |
| 5 | Deionized water | 745.0 |

A cationic, zinc-rich electrodepositable coating composition was prepared according to the following procedure using the ingredients listed in Table 3. The first charge of deionized water, Ingredient 1, was placed in a 600-mL stainless-steel beaker and heated to 43° C. A mixture of the cationic resin and the blocked isocyanate, Ingredients 2 and 3, was heated to 43° C. and slowly added to the beaker containing the warm deionized water and allowed to mix well using a cowles blade at 1,200 rpm. After 5 minutes of mixing, the treated zinc dust, Ingredient 4, was slowly added. This mixture was allowed to mix for an additional 5 minutes before it was poured into a 1,000-mL stainless-steel beaker containing the second deionized water charge using a cowles blade to achieve good mixing. The resulting electrodepositable coating composition bath had a pigment-to-binder ratio (P:B) of 9:1, a theoretical solids content of about 25%, about 90% zinc metal based on total solids, and a pH of 7 to 8.

Example 5—Preparation of an Anionic Zinc-Rich Electrodepositable Coating Composition

TABLE 4

| Ingredient # | Description | Amount (g) |
| --- | --- | --- |
| 1 | Powercron ® AR394[1] | 179.0 |
| 2 | Acrysol ™ TT-615[2] | 5.4 |
| 3 | Dimethylethanolamine | 0.723 |
| 4 | Treated Zinc Dust from Example 3 | 480.0 |
| 5 | Deionized water | 1468.0 |

[1]An anionic, acrylic-based electrodepositable coating composition commercially available from PPG Industries, Inc.
[2]A rheology modifier available from The Dow Chemical Company An anionic, zinc-rich electrodepositable coating composition was prepared according to the following procedure using the ingredients listed in Table 4. Ingredient 1 was weighed into a 1,000-mL steel beaker and placed under mild agitation, using a cowles blade. In a separate container, Ingredient 3 was mixed with 160 grams of Ingredient 5. This mixture was added to Ingredient 1 under agitation and mixed for 5 minutes. Ingredient 2 was diluted with 10 grams of Ingredient 5 in a small cup and added to the blend. An additional 10 grams of Ingredient 5 was used to rinse the small cup and was added to the blend. The agitation of the blend was increased significantly and the blend was left to mix for 20 minutes. Ingredient 4 was added to the blend under significant agitation and mixed for 20 minutes. 200 grams of Ingredient 5 was slowly added to the blend. The blend was taken off of agitation and transferred to a 2,000-mL glass beaker. Mild agitation was continued using a magnetic stir plate and a magnetic stir bar. The remainder of Ingredient 5 was then slowly added to the blend. The final bath had a theoretical solids content of about 25%, about 90% zinc metal based on total solids, a P:B ratio of 9.0:1.0, and a pH of 8 to 9.

Example 6—Preparation of Panels for Evaluation of Electrodepositable Coating Compositions Bare cold rolled steel panels measuring 4"×12" (available from ACT Laboratories of Hillside, Michigan as ACT 28110) were cleaned by wiping with Aromatic 100 solvent followed by acetone using paper towels. The residual solvent was baked off of the bare steel panels in an electric oven at 110° C. for 20 minutes. The panels were cut into the appropriate size, wrapped in inhibitor paper, and kept in a desiccator until time of use. Immediately prior to use, panels were cleaned again using the above-mentioned method and left hanging on a rack until used.

Example 7—Electrodeposition of a Cationic Zinc-Rich Electrodepositable Coating Composition The cationic, zinc-rich electrodepositable coating composition of Example 4 was coated onto bare steel panels prepared according to Example 6 by cationic electrodeposition. The test panel was immersed into a bath containing the electrodepositable coating composition of Example 4 having a bath temperature of 20° C. and served as the cathode in electrical communication with a counter-anode. The coating composition was electrodeposited onto the panel when an electrical potential of 100 volts was impressed between the electrodes for about one minute. The coated panels were rinsed and baked for 30 minutes at 200° C. in an electric oven to give smooth films with an average film build of 1.5 mils (about 38.1 microns).

Example 8—Electrodeposition of an Anionic Zinc-Rich Electrodepositable Coating Composition The anionic, zinc-rich electrodepositable coating composition of Example 5 was coated over bare steel panels prepared according to Example 6 by anionic electrodeposition. The test panel was immersed into a bath containing the electrodepositable coating composition of Example 5 serving as the anode and was coated using oppositely placed dual cathodes. Coating conditions were 200 volts at a bath temperature of 32° C. and no limit was placed on amperage. The coat outs were limited to 15 coulombs per 4"×6" panel. Coated panels were baked in an electric oven for a period of 30 minutes at 177° C. The resulting films were smooth and continuous. Dried film thickness was on average 1 mil (about 25.4 microns), with an increasing film build gradient towards the edges of the panel.

Example 9—Evaluation of the Zinc-Rich Coatings

The zinc-rich coating's ability to provide galvanic protection to a substrate was evaluated by the development of white rust (i.e., zinc corrosion product) under various corrosive test environments. All panels were evaluated for 500-hour salt spray testing according to ASTM B117, and for twenty cycles of cyclic corrosion testing according to SAE J2334. The panels coated with the anionic electrodepositable coating composition were also evaluated for twenty cycles of cyclic corrosion according to GMW14872 (STM-0919 modified so that 4"×6" panels were shot with single shot GM Gravel-O-meter instead of scribing). Galvanic protection was assessed as white rust on the face, scribe, and, if applicable, gravel impact marks of the coated panels. White rust indicates that the zinc rich coating oxidized in a sacrificial way to protect the base metal of the substrate. No red rust should be visible as the presence of red rust would indicate oxidation of the substrate. The results are provided in Table 5.

TABLE 5

| Zinc-Rich Coating | Assessment of Galvanic Effect Determined by Oxidation Products |
|---|---|
| Zinc-Rich Coating Electrodeposited According to Example 7 from the Cationic, Zinc-Rich Coating Composition of Example 4 | No Red Rust on Panel or Scribe |
| Zinc-Rich Coating Electrodeposited According to Example 8 from the Anionic, Zinc-Rich Coating Composition of Example 5 | No Red Rust on Panel, Scribe or Chipped Areas (i.e., gravel impact marks) |

The results shown in Table 5 demonstrate that the zinc-rich coating produced from the metal-rich electrodepositable coating compositions of the present invention oxidized in a sacrificial way to provide galvanic protection to the underlying substrate, as no evidence of oxidation of the underlying substrate in the form of red rust was detectable following corrosive testing.

Example 10—Evaluation of Zinc-Rich Coatings with Second E-Coat Layer

As discussed above, the zinc-rich coatings are conductive and could serve as a primer coating to a second electrodepositable coating layer. To evaluate the zinc-rich coatings as primer coatings, panels as coated according to Examples 7 and 8 were also coated with a cationic, epoxy-based electrodepositable coating composition (Powercron® FrameCoat™ II available from PPG Industries). The cationic epoxy coating was applied at 250 volts at a bath temperature of 32° C. for 120 seconds to the zinc-rich coated panels and control bare panels. The coated panels were baked in an electric oven for a period of 30 minutes at 177° C. The resulting films were smooth, continuous, and had a second-layer (or first-layer for the control panels) baked film thickness of 1 mil. The ability to provide protection against corrosion was evaluated by measuring the scribe creep width in millimeters on scribed panels after 500 hours of salt spray according to ASTM B117, and/or twenty cycles of cyclic corrosion testing according to SAE J2334.

TABLE 6

| Coating | Corrosion Test (scribe creep in mm) | |
| --- | --- | --- |
| | 500 Hours Salt Spray According to ASTM B117 | 20 cycles of SAE J2334 |
| Frame Coat II on Bare Steel-control | 9.8 | 11.0 |
| Frame Coat II on Cationic Zinc Rich Coating | 0.8 | — |
| Frame Coat lion Anionic Zinc Rich Coating | 1.3 | 0.2 |

The results shown in Table 6 demonstrate that the corrosion resistance of the coated substrate is significantly improved when either the cationic zinc-rich coating or anionic zinc-rich coating of the present invention is first applied to the substrate as a primer coating.

Example 11—Treatment of Substrates with Metallic Conditioning Compositions Prior to Electrodeposition of a Zinc-Rich Electrodepositable Coating Composition In the following examples, any bath that was heated above ambient temperature was heated with an immersion heater (Polyscience Sous Vide Professional, Model #7306AC1B5, available from Polyscience, Niles, Illinois). Any agitation of metal conditioning compositions was set to low agitation unless otherwise noted. Materials used to prepare the metallic conditioning compositions of this example were obtained from various chemical suppliers. The 2 wt. % copper solution was prepared by dilution of a copper nitrate solution (18 wt. % Cu in water) available from Shepherd Chemical Company (Cincinnati, OH). Anhydrous citric acid, nickel(II) chloride hexahydrate, sodium dihydrogen phosphite, and sodium hydroxide were all obtained from Fisher Scientific. Acetic acid was obtained from Acros Organics. Tin(II) methanesulfonate was obtained from Sigma Aldrich. After all of the ingredients for the metallic conditioning compositions were added, pH was measured using a pH meter (interface, DualStar pH/ISE Dual Channel Benchtop Meter, available from ThermoFisher Scientific, Waltham, Massachusetts, USA; pH probe, Fisher Scientific Accumet pH probe (Ag/AgCl reference electrode) by immersing the pH probe in the solution. A summary of the compositions is provided in the Table 7 below.

Treatment of Zinc Powder: Zinc powder (1000 g, Ultrapure #4) was obtained from Purity Zinc Metals (PZM, Clarksville, TN) was added to a 600-mL stainless-steel beaker. Methyl isobutylketone (333 g) was then added to beaker containing Zn powder. The slurry was stirred at 600 RPM using an overhead stirrer (Scilogex OS20-S available from Scilogex LLC Rocky Hill, CT). DYNASYLAN 4148 (10.0 g, 1.0 wt. % on Zn) available from Evonik (Parsippany, NJ) was added to the stirring slurry followed by deionized water (0.8 g). The suspension was stirred for 16 hours. After 16 hours, the material was filtered using a Buchner funnel and rinsed with excess MIBK. The powder was scraped into an aluminum baking dish and was allowed to air dry for 24 hours prior to use.

Preparation of Anionic Zn-Rich Electrodepositable Coating Composition Bath: Powercron Resin AR394 (373.0 g) available from PPG was added to a 1200-mL stainless-steel beaker which was stirred using a conn blade. To the stirring resin was added deionized water (200.0 g) and dimethylethanolamine (1.5 g, available from PPG, Springdale, PA). This mixture was agitated for 10 minutes. In a separate stainless-steel container, 11.3 g of unneutralized ACRYSOL TT-615 was added to 200 g of deionized water and allowed to stir for 20 minutes. The diluted Acrysol was added to the beaker containing AR394 and was stirred for 20 minutes. To that solution, a slurry consisting of 1000 g of the treated Zn powder described above and 300.0 g of deionized water was added. The resulting suspension was stirred for 10 minutes after which it was added to a plastic container and the volume was filled to a total of four liters with deionized water (2029 g).

Preparation of Framecoat II Cationic Electrocoat Bath: A Framecoat II cationic electrocoat bath was prepared by mixing resin CR681 (1801.0 grams, available from PPG), paste CP524 (243.8 grams, available from PPG), and deionized water (1755.2 grams). The electrocoat bath was used without ultrafiltration of the material.

Preparation of Metallic Conditioning Composition ("MCC") A: MCC A was prepared by the addition of 5,717 grams of deionized water to an empty 2-gallon plastic bucket. The water was heated to 110° F. (43.3° C.) and was circulated on low agitation using an immersion heater. 30.14 g of the 2% copper solution and 147 g of anhydrous citric acid were added to the warm DI water. The pH of MCC A was adjusted to 4.5 with 386 g of Chemfil buffer (an alkaline material available from PPG).

Preparation of MCC B: MCC B was prepared by the addition 5,735 grams of deionized water to an empty 2-gallon plastic bucket. The water was heated to 135° F. (57.2° C.) and circulated on high agitation using an immersion heater. 171.0 g of nickel(II) chloride hexahydrate and 65.0 g of $NaH_2PO_3$ were added to the warm DI water. Then acetic acid (14.3 grams, 24 mmol) and sodium hydroxide (9.6 g, 24 mmol) were both added to the plastic bucket. The dark green solution was agitated on high to allow all of the materials to dissolve.

Preparation of MCC C: MCC C was prepared by the addition 6,001 grams of deionized water to an empty 2-gallon plastic bucket. The water was heated to 110° F. (43.3° C.) and circulated on low agitation using an immersion heater. 15.8 g of tin(II) methanesulfonate solution (50% w/w in water) was added to the warm DI water. The pH of the solution was increased to 3.5 using a 50% potassium hydroxide solution. Upon pH adjustment, the solution turned from clear to white and opaque.

TABLE 7

Metallic conditioning compositions.

| Metallic Conditioning Composition | Metal Ion ($M^{n+}$) | Metal Ion Concentration (ppm) | Metal Salt | pH | Additives |
| --- | --- | --- | --- | --- | --- |
| MCC A | $Cu^{2+}$ | 105 | Copper nitrate | 4.5 | Citric acid |
| MCC B | $Ni^{2+}$ | 7364 | Nickel (II) chloride hexahydrate | — | Sodium acetate and sodium dihydrogen phosphite |
| MCC C | $Sn^{2+}$ | 516 | Tin (II) Methanesulfonate | 3.5 | None |

Preparation of an Alkaline Cleaner I (AC I): A rectangular stainless-steel tank with a total volume of 37 gallons, equipped with spray nozzles, was filled with 10 gallons of deionized water. To this was added 500 mL of Chemkleen 2010LP (a phosphate-free alkaline cleaner available from PPG Industries, Inc.) and 50 mL of Chemkleen 181ALP (a phosphate-free blended surfactant additive available from PPG Industries, Inc.). AC I was used for all examples below.

Panels were treated using either Treatment Method A or B, outlined in Tables 8 and 9 below. All panels treated were cold rolled steel test panels (4"×12") obtained from ACT Test Panel Technologies of Hillsdale, MI (Item #28110, audit grade, cut only, unpolished). Panels were cut into 4"×4" squares and a hole was punched into the panel prior to alkaline cleaning.

TABLE 8

Treatment Method A.

| | |
|---|---|
| Step 1A | Alkaline cleaner (120 seconds, 125° F., spray application) |
| Step 2A | Deionized water rinse (30 seconds, 75° F., immersion application) |
| Step 3A | Deionized water rinse (30 seconds, 75° F., spray application) |
| Step 4A | Hot Air Dry (120 seconds, 140° F.) |

For panels treated according to Treatment Method A, panels were spray cleaned and degreased for 120 seconds at 10-15 psi in the alkaline cleaner (125° F.) using Vee-jet nozzles (Step 1A) and rinsed with deionized water by immersing in a deionized water bath (75° F.) for 30 seconds (Step 2A) followed by a deionized water spray rinse using a Melnor Rear-Trigger 7-Pattern nozzle set to shower mode (available from Home Depot) (Step 3A). Panels were then dried with hot air (140° F.) for 120 seconds using a Hi-Velocity handheld blow-dryer made by Oster® (model number 078302-300-000) on high-setting (Step 4A).

TABLE 9

Treatment Method B.

| | |
|---|---|
| Step 1B | Alkaline cleaner (120 seconds, 125° F., spray application) |
| Step 2B | Deionized water rinse (30 seconds, 75° F., immersion application) |
| Step 3B | Deionized water rinse (30 seconds, 75° F., spray application) |
| Step 4B | Metal Conditioning Composition (immersion application) |
| Step 5B | Deionized water rinse (30 seconds, 75° F., spray application) |
| Step 6B | Hot Air Dry (120 seconds, 140° F.) |

For panels treated using Treatment Method B, panels were spray cleaned and degreased for 120 seconds at 10-15 psi in the alkaline cleaner (125° F.) using Vee-jet nozzles (Step 1B) and rinsed with deionized water by immersing in a deionized water bath (75° F.) for 30 seconds (Step 2B) followed by a deionized water spray rinse using a Melnor Rear-Trigger 7-Pattern nozzle set to shower mode (available from Home Depot) (Step 3 B). Panels were then treated according to one of treatment condition A, B, C or D, with treatment conditions B, C and D including either MCC A, MCC B, or MCC C, at the temperature and time specified in Table 10 below (Step 4B). After treatment with the metallic conditioning compositions, panels were spray rinsed with deionized water as described above (Step 5B). Panels were then dried with hot air (140° F.) for 120 seconds using a Hi-Velocity handheld blow-dryer made by Oster® (model number 078302-300-000) on high-setting (Step 6B).

TABLE 10

Treatment conditions for Treatment Method B.

| Treatment Condition | Cleaner Bath | Metallic Conditioning Composition | Metal in MCC | MCC Application Time (s) | MMC Application Temperature (° C.) |
|---|---|---|---|---|---|
| A | AC I | None | None | N/A | N/A |
| B | AC I | MCC A | Copper | 120 | 40 |
| C | AC I | MCC B | Nickel | 210 | 55 |
| D | AC I | MCC C | Tin | 120 | 40 |

Following completion of Treatment Methods A or B, all panels were electrocoated with the zinc-rich electrodepositable coating composition as prepared above. The treated panel was immersed in the electrodepositable coating composition serving as the anode in electrical communication with a counter electrode serving as a cathode. A rectifier (Xantrax Model XFR600-2, Elkhart, Indiana, or Sorensen XG 300-5.6, Ameteck, Berwyn, Pennsylvania) which was DC-power supplied was used to electrodeposit the zinc-rich electrodepositable coating composition. The coating conditions were 200 V, 90° F. bath temperature, 15 coulombs, and a 4 amperes limit. After deposition, the panels were spray rinsed with deionized water, allowed to dry at ambient temperature for 10 minutes, and then baked at 375° F. for 30 minutes in an electric oven (Despatch Model LFD-1-42). The dry film thickness ("DFT") of the applied Zn-rich coating was 1.1-1.3 mils in thickness.

A set of panels that had been electrocoated with the zinc-rich electrodepositable coating were also electrocoated with a cationic electrocoat (Framecoat II), prepared as described above. The Framecoat II electrodepositable coating composition was applied using the same set-up as described above for the zinc-rich electrodepositable coating composition with the exception that the substrate to be coated served as a cathode. The coating conditions were 225 V with a 15 second ramps, 90° F. bath temperature, 120 seconds coat out time, and a current density of 1.6 mA/cm$^2$. After electrodeposition, the panels were spray rinsed with deionized water, allowed to dry at ambient temperature for 10 minutes, and baked at 375° F. for 30 minutes in an electric oven (Despatch Model LFD-1-42). The DFT of the applied cationic electrodepositable coating layer was 1.0 mils in thickness.

Panels from each set were scribed with a 2-inch vertical line in the middle of the panel down to the metal substrate. Scribed panels were exposed to GM cyclic corrosion test GMW14872 for 10 days and neutral salt spray (NSS) according to ASTM B-117 for 10 days. After testing, panels were rinsed with deionized water and allowed to air dry. After corrosion testing, the panels that were electrocoated with the zinc-rich electrodepositable coating composition only were analyzed for corrosion product formation and were rated according to the rating system included in Table 11. The panels that included the second electrodepositable layer were evaluated for scribe creep and red and/or white rust formation. Scribe creep refers to the area of paint loss around the scribe either through corrosion or disbondment (e.g., affected paint to affected paint). Panels were run in duplicate or triplicate and then averaged. The results of corrosion testing for the panels treated with the zinc-rich electrodepositable coating composition only are presented in Table 12, and the results for panels treated with both the zinc-rich electrodepositable coating composition and second electrodepositable coating layer are presented in Table 13.

TABLE 11

Description of Corrosion Results for Zn-Rich Coated Systems Only.

| Rating | Scribe Description[A] | Face Description[A] | Edge Description[A] |
|---|---|---|---|
| 0 | 100% Red Rust (RR) | 100% Red Rust | 100% Red Rust |
| 1 | 75-99% RR | 75-99% RR | 75-99% RR |
| 2 | At least 75% RR | 50-74% RR | 50-74% RR |
| 3 | At least 50% White Rust (WR)/ undamaged Zn | At least 75% WR/ undamaged Zn | At least 75% WR/ undamaged Zn |
| 4 | 95-99% WR | At least 95% WR and/or Undamaged Zn | At least 95% WR and/or Undamaged Zn |
| 5 | 100% WR | 100% WR or Undamaged Zn | 100% WR and/or Undamaged Zn |

[A]Sum of red rust (RR) and white rust (WR) total 100% of scribe length, face area, or edge.

TABLE 12

Results of Corrosion Testing for Zn-Rich Coated Only Conditions.

| Treatment Condition | Metal in MCC | NSS Rating | GMW14872 Rating |
|---|---|---|---|
| A | None | 4 | 5 |
| B | Copper | 3 | 5 |
| C | Nickel | 5 | 5 |
| D | Tin | 1 | 3 |

TABLE 13

Results of Corrosion Testing for Two Coat Systems Panels.

| | | NSS Rating | | GMW14872 Rating | |
|---|---|---|---|---|---|
| Treatment Condition | Metal in MCC | Scribe Creep (mm) | % White Rust in Scribe[A] | Scribe Creep (mm) | % White Rust in Scribe[A] |
| A | None | <1.0 | 30% | 3.0 | 0% |
| B | Copper | <1.0 | 10% | 5.0 | 0% |
| C | Nickel | <1.0 | 30% | <1.0 | 25% |
| D | Tin | <1.0 | 0% | <1.0 | 0% |

[A]Sum of red rust (iron oxide) and white rust (zinc oxide) in scribe equals 100%

As shown in Table 12, treatment with the metallic conditioning composition comprising nickel improved corrosion performance as rated by the NSS Rating for the panels treated with the zinc-rich electrodepositable coating composition. As shown in Table 13, treatment with the metallic conditioning composition comprising nickel or tin improved corrosion performance for the two-coat panels with respect to scribe creep according to GMW14872 Rating with the nickel-containing composition also showing an improvement in the percentage of white rust formation.

Example 12: Application of Sealing Composition Comprising Phosphonic Acid after Electrodeposition of Zn-Rich Coating Cold rolled steel test panels (4"×12") obtained from ACT Test Panel Technologies of Hillsdale, MI (Item #28110, audit grade, cut only, unpolished) were used in this example. Panels were cut into 4"×6" squares and a hole was punched into the panel prior to alkaline cleaning.

TABLE 14

Treatment Method C for Cleaning CRS Panels.

| Step 1C | Alkaline cleaner, AC I (120 seconds, 125° F., spray application) |
| Step 2C | Deionized water rinse (30 seconds, 75° F., immersion application) |
| Step 3C | Deionized water rinse (30 seconds, 75° F., spray application) |
| Step 4C | Hot Air Dry (120 seconds, 140° F.) |

The test panels were cleaned using Treatment Method C outlined in Table 14 above. The panels were spray cleaned and degreased for 120 seconds at 10-15 psi in the alkaline cleaner (AC I, 125° F.) using Vee-jet nozzles (Step 1C) and rinsed with deionized water by immersing in a deionized water bath (75° F.) for 30 seconds (Step 2C) followed by a deionized water spray rinse using a Melnor Rear-Trigger 7-Pattern nozzle set to shower mode (available from Home Depot) (Step 3C). Panels were then dried with hot air (140° F.) for 120 seconds using a Hi-Velocity handheld blow-dryer made by Oster® (model number 078302-300-000) on high-setting (Step 4C).

Preparation of a Sealing Composition Comprising Polyvinylphosphonic Acid (PVPA): To a two-gallon plastic tube was added 7600 grams of deionized water, 17.8 g of polyvinylphosphonic acid solution (30 wt. % in water) provided by Merck Performance Materials GMBH, and 5.68 g of DMEA. The solution was stirred with a plastic pipette until it was homogenous.

TABLE 15

Treatment Method D for Panels Treated with Sealing Composition PVPA.

| Step 1D | Electrodeposition of Zn-Rich Coating |
| Step 2D | Deionized water rinse (30 seconds, 75° F., spray application) |
| Step 3D | Ambient Flash (10 minutes, 70° F.) |
| Step 4D | Application of Seal Composition PVPA (120 seconds, 70° F., no agitation) |
| Step 5D | Bake (30 minutes, 375° F.) |

TABLE 16

Treatment Method E for Panels without Sealing Composition.

| Step 1E | Electrodeposition of Zn-Rich Coating |
| Step 2E | Deionized water rinse (30 seconds, 75° F., spray application) |
| Step 3E | Ambient Flash (10 minutes, 70° F.) |
| Step 4E | Bake (30 minutes, 375° F.) |

After alkaline cleaning of the substrates, substrates were treated according to either Treatment Method D in Table 15 or Treatment Method E in Table 16. An anionic zinc-rich electrodepositable coating composition was prepared in the same manner as in Example 11, but the composition included 500 g of treated zinc powder, 186.5 g of AR394 resin, 5.6 g of ACRYSOL TT-615, 0.8 g of DMEA, and 1776.0 g of deionized water. The electrodepositable coating composition was electrodeposited onto the substrate by the same method as Example 11, with coating conditions of 200 V, 90° F. bath temperature, 15 coulombs, and a 5 amperes limit.

For panels treated according to Treatment Method D, after electrodeposition of the zinc-rich electrodepositable coating composition, deionized water was rinsed over the coated substrate surface, followed by a 10 minutes ambient flash. After the visible water evaporated, the panel was immersed for two minutes in the sealing composition comprising PVPA without agitation. Subsequently, the panel was placed into an electric oven and baked for 30 minutes at 375° F. using the same procedure as Example 11. The DFT of the electrodeposited coating treated with the sealing composition was 1.5 mils.

For panels coated using Treatment Method E, after electrodeposition of the zinc-rich electrodepositable coating composition, deionized water was rinsed over the coated substrate surface, followed by a 10 minutes ambient flash. After the visible water evaporated, panels were placed into an electric oven and baked for 30 minutes at 375° F. using the same procedure as Example 11. The DFT of the electrodeposited coating without sealing composition treatment was 1.5 mils.

All panels were then electrocoated with using the same cationic electrodepositable coating composition, Framecoat II, and procedure as described in Example 11. After baking, the DFT of the applied second electrodepositable coating layer was 1.0 mils.

Panels were scribed with either a 3-inch vertical line in the middle of the panel down to the metal substrate or a 3-inch diagonal line (top right to bottom left) down to the metal substrate. Panels were then placed in GMW14872 testing (vertical scribe) or J2334 testing (diagonal scribe) for a total of 40 cycles. After testing, panels were rinsed with deionized water and allowed to air dry. The scribe creep was then measured and is reported in Table 17.

TABLE 17

Effect of Sealing Composition on Corrosion Results.

| Sealing Condition | Sealing Composition Additive | Scribe Creep (mm) in GMW14872 | Scribe Creep (mm) in J2334 |
| --- | --- | --- | --- |
| Control | none | 10.0 | 5.4 |
| Exp. | Polyvinyl phosphonic acid solution | 3.0 | 1.7 |

As shown in Table 17, treatment of the zinc-rich electrodeposited coating with a sealing composition having PVPA improved the corrosion performance according to both GMW14872 and J2334 as demonstrated by a decreased scribe creep.

Example 13: Application of Sealing Composition Comprising Carbonate Salts after Electrodeposition of Zn-Rich Coating Cold rolled steel test panels (4"×12") obtained from ACT Test Panel Technologies of Hillsdale, MI (Item #28110, audit grade, cut only, unpolished) were used in this example. Panels were cut into 4"×4" squares and a hole was punched into the panel prior to alkaline cleaning.

The test panels were cleaned in the same manner as in Example 12 using Treatment Method C outlined in Table 14 above.

Preparation of Sealing Composition Including Li, Na or Ammonium Carbonate: To a three-gallon plastic bucket was added 11.4 kg of water followed by 28.5 g of a carbonate salt. The composition was stirred with a plastic pipette until dissolution of the carbonate salt occurred. Sealing composition comprising lithium carbonate (SC Li), ammonium carbonate (SC Am, and sodium carbonate (SC Na) were prepared. Each carbonate salt was obtained from Fisher Scientific.

TABLE 18

Treatment Method G for Panels Treated with Carbonate Sealing Composition.

| Step 1G | Electrodeposition of Zn-Rich Coating |
| Step 2G | Deionized water rinse (30 seconds, 75° F., spray application) |
| Step 3G | Ambient Flash (10 minutes, 70° F.) |
| Step 4G | Application of Seal Composition (120 seconds, 70° F., no agitation) |
| Step 5G | Bake (30 minutes, 375° F.) |

TABLE 19

Treatment Method H for Panels without Sealing Composition.

| Step 1H | Electrodeposition of Zn-Rich Coating |
| Step 2H | Deionized water rinse (30 seconds, 75° F., spray application) |
| Step 3H | Ambient Flash (10 minutes, 70° F.) |
| Step 4H | Bake (30 minutes, 375° F.) |

After alkaline cleaning of the substrates, substrates were treated according to either Treatment Method G in Table 18 or Treatment Method H in Table 19. The same anionic zinc-rich electrodepositable coating composition as described in Example 12 was electrodeposited onto the substrates by the same procedure described in Example 12 for both treatment methods.

For panels treated according to Treatment Method G, after electrodeposition of the zinc-rich electrodepositable coating composition, deionized water was rinsed over the coated substrate surface, followed by a 10 minutes ambient flash. After the visible water evaporated, the panel was immersed for two minutes in one of the three sealing compositions comprising a carbonate salt without agitation. Subsequently, the panel was placed into an electric oven and baked for 30 minutes at 375° F. using the same procedure as Example 11. The DFT of the electrodeposited coating treated with the sealing composition was 1.5 mils.

For panels coated using Treatment Method H, after electrodeposition of the zinc-rich electrodepositable coating composition, deionized water was rinsed over the coated substrate surface, followed by a 10 minutes ambient flash. After the visible water evaporated, panels were placed into an electric oven and baked for 30 minutes at 375° F. using the same procedure as Example 11. The DFT of the electrodeposited coating without treatment with a sealing composition was 1.5 mils.

All panels were then electrocoated using the same cationic electrodepositable coating composition, Framecoat II, and procedure as described in Example 11. After baking, the DFT of the second electrodepositable coating layer was 1.0 mils.

Panels were scribed with either a 2-inch vertical line in the middle of the panel down to the metal substrate or a 2-inch diagonal line (top right to bottom left) down to the metal substrate. Panels were then placed in GMW14872 testing (vertical scribe) or J2334 testing (diagonal scribe) for a total of 40 cycles. After testing, panels were rinsed with deionized water and allowed to air dry. The scribe creep was then measured and is reported in Table 20.

TABLE 20

Corrosion Results for Carbonate Sealing Compositions.

| Sealing Condition | Sealing Composition Additive | Scribe Creep (mm) in GMW14872 | Scribe Creep (mm) in J2334 |
|---|---|---|---|
| Control | none | 5.6 | 3.7 |
| SC Li | Lithium Carbonate | 1.6 | 1.6 |
| SC Na | Sodium Carbonate | 2.1 | 1.6 |
| SC Am | Ammonium Carbonate | 5.0 | 2.4 |

As shown in Table 20, treatment of the zinc-rich electrodeposited coating with a sealing composition having a carbonate salt, such as lithium carbonate, sodium carbonate or ammonium carbonate, improved the corrosion performance according to both GMW14872 and J2334 as demonstrated by a decreased scribe creep.

Example 14: Addition of Rheology Modifier to Improve Bath Stability and Coating Uniformity Treatment of Zinc Powder: Zinc powder (Ultrapure #4) obtained from Purity Zinc Metals (PZM, Clarksville, TN) was treated according to the method described in Example 11, except that the following amounts and materials were used: 1000 g zinc powder, 333 g MIBK, 7.5 g DYNASYLAN 4148, and 1.0 g deionized water. This material was used in the preparation of both the zinc-rich electrodepositable coating compositions with and without the rheology modifier.

Preparation of Zinc-Rich Electrodepositable Coating Composition LV (ZRE L): An anionic electrodepositable coating composition was prepared using the same method as in Example 11, with the exception that the following amounts of materials were used: 250 g of treated zinc powder, 94.0 g of AR394 resin, 1.0 g of DMEA, and 684.0 g of deionized water, and the rheology modifier (ACRYSOL TT-615) was omitted.

Preparation of Zinc-Rich Electrodepositable Coating Composition HV (ZRE H: An anionic electrodepositable coating composition was prepared using the same method as in Example 11, with the exception that the following amounts of materials were used: 252.0 g treated zinc powder, 94.0 g of AR394 resin, 2.8 g of rheology modifier (ACRYSOL TT-615), 0.4 g of DMEA, and 688.0 g of deionized water.

Evaluation of Composition Stability: The rate of settling was determined using a Biolin Scientific Attension Force Tensiometer (Model: Sigma 703) equipped with a platinum pan. A small sample of ZRE LV or ZRE HV was placed into 4 oz. glass jar. The glass jar containing the zinc-rich electrodepositable coating composition was loaded onto the tensiometer platform and the platinum pan was inserted into the paint below the liquid surface. The instrument was zeroed and data collection began. The rate of settling of the components of the composition (reported in g/hr) was monitored over a five-minute period. The maximum settling rate for ZRE LV and ZRE HV are in Table 21.

TABLE 21

Settling Rates of Zn-Rich Electrocoats.

| Zn-Rich Formula | Rheology Modifier | Maximum Settling Rate (g/hr) | Observations |
|---|---|---|---|
| ZRE LV | None | 3.80 | Max settling rate immediately reach |
| ZRE HV | ACRYSOL TT-615 | 2.45 | Maximum settling rate reach after 90 seconds |

As shown in Table 21, the presence of the rheology modifier improved the stability of the zinc-rich electrodepositable coating composition.

Comparison of Coating Uniformity: Cold rolled steel test panels (4"×12") were obtained from ACT Test Panel Technologies of Hillsdale, MI (Item #28110, audit grade, cut only, unpolished). Panels were cut into 3"×2" rectangles prior to alkaline cleaning. The test panels were cleaned in the same manner as in Example 12 using Treatment Method C outlined in Table 14 above. After alkaline cleaning of the panels, one of the zinc-rich electrodepositable coating compositions, ZRE LV or ZRE HV, was applied by the same procedure described in Example 12 with coating conditions of 100 V, 85° F. bath temperature, 4 coulombs, and a 5 amperes limit. After coating electrodeposition, deionized water was rinsed over the surface of the substrate followed by a 10 minutes ambient flash. Subsequently, the panel was placed into an electric oven and baked for 30 minutes at 375° F. using the same procedure as Example 11. The DFT of the applied zinc-rich coating on the substrates was 1.2-1.4 mils. When the rheology modifier was added to the zinc-rich electrodepositable coating composition, a more uniform or consistent film build across the panel was observed at a similar average film build compared to the composition that lacked the rheology modifier as shown in Table 22. For clarity, the top center of the panel includes the hold punched into the panel while the bottom center is the opposite end of the panel.

TABLE 22

Film build Comparisons on CRS Panel with and without rheology modifier.

| Zn-Rich Formula | Rheology Modifier | Avg. DFT (mils) | Top Center (TC) DFT (mils) | Bottom Center (BC) DFT (mils) |
|---|---|---|---|---|
| ZRE LV | None | 1.4 | 0.8 | 2.1 |
| ZRE HV | Acrysol ™ TT-615 | 1.2 | 1.2 | 1.2 |

These results indicate that the inclusion of the rheology modifier allows for a more uniform film build of the zinc-rich electrodepositable coating composition.

Example 15: Zinc-Rich Electrodepositable Coating Composition Including Corrosion Inhibitors Treatment of Zinc Powder: Zinc powder (Ultrapure #4) obtained from Purity Zinc Metals (PZM, Clarksville, TN) was treated according to the method described in Example 11, except that the following amounts and materials were used: 1500 g zinc powder, 500 g MIBK, 15.0 g DYNASYLAN 4148, and 1.0 g deionized water. This material was used in the preparation the control Zn-rich Ecoat bath and Zn-rich Ecoat baths with corrosion inhibitors added.

Preparation of Zinc-Rich Electrodepositable Coating Composition (ZRE CMP): An anionic electrodepositable coating composition was prepared using the same method as in Example 11, with the exception that the following amounts of materials were used: 500 g of treated zinc powder, 182.3.0 g of AR394 resin, 0.8 g of DMEA, 5.6 g of ACRYSOL TT-615 and 1720.0 g of deionized water.

Preparation of Zinc-Rich Electrodepositable Coating Composition with MBT (ZRE MBT): An anionic zinc-rich electrodepositable coating composition was prepared as follows: Powercron Resin AR394 (182.3 g) available from PPG was added to a stainless-steel beaker which was stirred using a conn blade. In a separate stainless-steel container, 5.6 g of unneutralized ACRYSOL TT-615 was added to 100 g of deionized water and allowed to stir for 20 minutes. In a glass beaker, 1.37 g of sodium 2-mercaptobenzothiazole (MBT) available from TCI was added to 100.0 g of deionized water and the salt was allowed to dissolve. The diluted ACRYSOL composition was added to the beaker containing AR394 and was stirred for 20 minutes. Then the corrosion inhibitor solution was added to the resin/rheology modifier mixture. Finally, a slurry consisting of 500.0 g of the treated zinc powder and 150.0 g of deionized water was added. The resulting suspension was stirred for 10 minutes after which it was added to a plastic container and the volume was filled to a total of two liters with deionized water (1370.0 g). The composition had a concentration of sodium 2-mercaptobenzothiazole of 500 ppm.

Preparation of Zinc-Rich Electrodepositable Coating Composition with Strontium Hydroxide (ZRE SH): An anionic zinc-rich electrodepositable coating composition was prepared by the same method and with the same amounts as ZRE MBT with the exception that the MBT solution was omitted, and 3.7 g of strontium hydroxide octahydrate (available from Acros Organics) was added after addition of the treated zinc powder. The composition was allowed to stir for 30 minutes after addition of the strontium hydroxide prior to coating panels. The composition had a concentration of strontium hydroxide concentration of 500 ppm.

Cold rolled steel test panels (4"×12") were obtained from ACT Test Panel Technologies of Hillsdale, MI (Item #28110, audit grade, cut only, unpolished). Panels were cut into 4"×4" squares and a hole was punched into the panel prior to alkaline cleaning. The test panels were cleaned in the same manner as in Example 12 using Treatment Method C outlined in Table 14 above. After alkaline cleaning of the panels, a zinc-rich electrodepositable coating composition (ZRE CMP, ZRE MBT or ZRE SH) was electrodeposited onto the panel by the same procedure described in Example 12 with coating conditions of 200 V, 90° F. bath temperature, 15 coulombs, and a 4 amperes limit. After electrodeposition, the panels were subjected to a 10 minutes ambient flash. Subsequently, the panel was placed into an electric oven and baked for 30 minutes at 375° F. using the same procedure as Example 11. The DFT of the electrodeposited coating was 1.3 mil.

A set of the zinc-coated panels were then electrocoated using the same cationic electrodepositable coating composition, Framecoat II, and procedure as described in Example 11. After electrodeposition of the second coating layer, the panels were processed in the same manner as previously described. The DFT of the second electrodepositable layer was 1.0 mil.

Panels were scribed with a 2-inch vertical line in the middle of the panel down to the metal substrate. Panels were placed into NSS testing according to ASTM B-117 for 10 days. The corrosion resistance for panels having only the zinc-rich electrodepositable coating were evaluated according to the parameters set forth in Table 11. For panels with the two-coat system (ZRE+Framecoat II), the scribe creep was measured and the % white in the scribe was reported.

TABLE 23

Corrosion Results for CI Added to Zn-Rich Ecoat in Salt Spray.

| Zn-Rich Formula | CI Additive | Zn-Rich Only Corrosion Rating | Two Coat System- Scribe Creep (mm) | Two Coat System- % White Rust in Scribe[4] |
|---|---|---|---|---|
| ZRE CMP | None | 4 | <1 | 30% |
| ZRE MBT | MBT | 5 | <1 | 60% |
| ZRE SH | Sr | 5 | <1 | 100% |

[4]Sum of red rust (iron oxide) and white rust (zinc oxide) in scribe equals 100%

As shown in Table 23, addition of a corrosion inhibitor improved corrosion resistance of both the zinc-rich only and two-coat coating system for both MBT and strontium hydroxide. The improvement in the zinc-rich only coating is demonstrated by an improved corrosion rating over a zinc-rich electrodepositable coating composition that does not include the corrosion inhibitors. The improvement in the two-coat system is demonstrated in an increase in the production of white rust relative to red rust, with the strontium hydroxide eliminating the generation of red rust.

Example 16: Evaluation of Surface Treatments of Metal Particles

A summary of evaluated surface treatments is provided in Table 24 below.

TABLE 24

Zinc Pigment Surface Treatments with Different Reactive Groups.

| Bath Description | Zn Surface Treatment | Reactive Group | Tail Group |
|---|---|---|---|
| Surface Treatment 1 (ST-1) | DYNASYLAN 4148- PEG Functional | Silane | Poly(ethylene glycol) |
| Surface Treatment 2 (ST-2) | DYNASYLAN 1189- Secondary Amine | Silane | Secondary amine |
| Surface Treatment 3 (ST-3) | Cetyltrimethyl- ammonium Chloride (CTAC) | Quaternary Ammonium | Cetyl |
| Surface Treatment 4 (ST-4) | Polyvinylphosphonic Acid (PVPA) | Phosphonate | Poly(vinyl) |
| Surface Treatment 5 (ST-5) | 12-Hydroxystearic Acid (12-HSA) | Carboxylate | Stearic ($C_{18}H_{35}$) |

Treatment of Zinc Powder with DYNASYLAN 4148 (ST-1): Zinc powder (Ultrapure #4) obtained from Purity Zinc Metals (PZM, Clarksville, TN) was treated according to the method described in Example 11, except that the following amounts and materials were used: 500 g zinc powder, 167 g MIBK, 5.0 g DYNASYLAN 4148, and 0.4 g deionized water.

Preparation of Zinc-Rich Electrodepositable Coating Composition with Zinc Powder Treated with ST-1 (ZRE ST-1): An anionic electrodepositable coating composition was prepared using the same method as in Example 11, with the exception that the following amounts of materials were used: 500 g of zinc powder treated with ST-1, 182.3 g of AR394 resin, 0.8 g of DMEA, 5.6 g of ACRYSOL TT-615 and 1720.0 g of deionized water.

Treatment of Zinc Powder with DYNASYLAN 1189 (ST-2): Zinc powder (Ultrapure #4) obtained from Purity Zinc Metals (PZM, Clarksville, TN) was treated according to the method described in Example 11, except that the following amounts and materials were used: 1500 g Zn powder, 500 g MIBK, 15.0 g DYNASYLAN 1189 (commercially supplied by Evonik), and 1.0 g deionized water.

Preparation of Zinc-Rich Electrodepositable Coating Composition with Zinc Powder Treated with ST-2 (ZRE ST-2): An anionic electrodepositable coating composition was prepared using the same method as in Example 11, with the exception that the following amounts of materials were used: 500 g of zinc powder treated with ST-2, 182.3 g of AR394 resin, 0.8 g of DMEA, 5.6 g of ACRYSOL TT-615 and 1720.0 g of deionized water.

Treatment of Zinc Powder with CTAC (ST-3):

Cetyltrimethyl ammonium chloride (5.0 g, 25 wt. % in DI water) available from Aldrich was added to 250 g of deionized water. DMEA was added to adjust the pH to 9.0. Then, 500.0 g of zinc powder (Ultrapure #4) obtained from Purity Zinc Metals (PZM, Clarksville, TN) was added to the solution and stirred for three hours during which the composition became very foamy. This material was used directly for preparing a zinc-rich electrodepositable coating composition.

Preparation of Zinc-Rich Electrodepositable Coating Composition with Zinc Powder Treated with ST-3 (ZRE ST-3): An anionic zinc-rich electrodepositable coating composition was prepared as follows: Powercron Resin AR394 (177.1 g) available from PPG was added to a stainless-steel beaker which was stirred using a conn blade. To the stirring resin was added deionized water (100.0 g) and DMEA (0.71 g). This mixture was agitated for 10 minutes. In a separate stainless-steel container, 5.2 g of unneutralized ACRYSOL TT-615 was added to 100 g of deionized water and allowed to stir for 20 minutes. The diluted ACRYSOL composition was added to the beaker containing AR394 and was stirred for 20 minutes. Then, the foamy composition of ST-3 treated zinc powder was added to the resin/rheology modifier mixture. The resulting composition was stirred for 10 minutes after which it was added to a plastic container and the volume was filled to a total of two liters with deionized water (1184.0 g).

Treatment of Zinc Powder with PVPA (ST-4): Polyvinylphosphonic acid solution (4.8 g, 30 wt. % in water) provided by Merck Performance Materials GMBH was added to 250 g of deionized water. To that solution was added DMEA to adjust the pH to 9.0. Then 475.0 g of zinc powder (Ultrapure #4) obtained from Purity Zinc Metals (PZM, Clarksville, TN) was added to the solution and stirred for three hours. After stirring, the solution was decanted leaving behind zinc powder which was used directly to prepare a zinc-rich electrodepositable coating composition.

Preparation of Zinc-Rich Electrodepositable Coating Composition with Zinc Powder Treated with ST-4 (ZRE ST-4): An anionic electrodepositable coating composition was prepared using the same method as in Example 11, with the exception that the following amounts of materials were used: 475.0 g of treated zinc powder treated with ST-4, 177.1 g of AR394 resin, 0.7 g of DMEA, 5.3 g of ACRYSOL TT-615 and 1634 g of deionized water.

Treatment of Zinc Powder with 12-HSA (ST-5): 12-Hydroxystrearic acid (4.75 g, "12-HSA") available from PPG was added to 250 g of deionized water. To that solution was added DMEA to adjust to pH to 9.0. Then, 475.0 g of zinc powder (Ultrapure #4) obtained from Purity Zinc Metals (PZM, Clarksville, TN) was added to the solution and stirred for three hours. After stirring, the solution was decanted leaving behind zinc powder which was used directly to prepare a zinc-rich electrodepositable coating composition.

Preparation of Zinc-Rich Electrodepositable Coating Composition with Zinc Powder Treated with ST-5 (ZRE ST-5): An anionic electrodepositable coating composition was prepared using the same method as in Example 11, with the exception that the following amounts of materials were used: 475.0 g of treated zinc powder treated with ST-5, 177.1 g of AR394 resin, 0.7 g of DMEA, 5.3 g of ACRYSOL TT-615 and 1634 g of deionized water.

Cold rolled steel test panels (4"×12") were obtained from ACT Test Panel Technologies of Hillsdale, MI (Item #28110, audit grade, cut only, unpolished). Panels were cut into 4"×4" squares and a hole punched in the panel prior to alkaline cleaning. The test panels were cleaned in the same manner as in Example 12 using Treatment Method C outlined in Table 14 above. After alkaline cleaning of the panels, a zinc-rich electrodepositable coating composition (ZRE ST-1, ZRE ST-2, ZRE ST-3, ZRE ST-4, or ZRE ST-5) was electrodeposited onto the panel by the same procedure as described in Example 12 with coating conditions of 200 V, 90° F. bath temperature, 15 coulombs, and a 4 amperes limit. After electrodeposition, the panels were subjected to a 10 minutes ambient flash. Subsequently, the panel was placed into an electric oven and baked for 30 minutes at 375° F. using the same procedure as Example 11. The DFT of the electrodeposited coatings was 1.3 mils.

A set of the coated panels was then electrocoated using the same cationic electrodepositable coating composition, Framecoat II, and procedure as described in Example 11. After electrodeposition of the second coating layer, the panels were processed in the same manner as previously described. The DFT of the second electrodepositable layer was 1.0 mil.

Panels were scribed with a 2-inch vertical line in the middle of the panel down to the metal substrate. Panels were placed into NSS testing according to ASTM B-117 for 10 days. The corrosion resistance for panels having only the zinc-rich electrodepositable coating were evaluated according to the parameters set forth in Table 11. For panels with the two-coat system (ZRE+Framecoat II), the scribe creep was measured and the % white in the scribe was reported.

TABLE 25

Corrosion Results for Different Zinc Surface Treatments in Salt Spray.

| Surface Treatment | Reactive Group | Zn-Rich Only Corrosion Rating | Two Coat System-Scribe Creep (mm) | Two Coat System-% White Rust in Scribe[4] |
|---|---|---|---|---|
| ST-1 | (PEG) Silane | 4 | <1 | 30% |
| ST-2 | (Amine) Silane | 2 | <1 | 0% |
| ST-3 | Ammonium | 3 | <1 | 20% |
| ST-4 | Phosphonate | 3 | <1 | 0% |
| ST-5 | Carboxylate | 5 | <1 | 40% |

[4]Sum of red rust (iron oxide) and white rust (zinc oxide) in scribe equals 100%

As shown in Table 25, the corrosion resistance in salt spray testing of the zinc-rich electrodepositable coating composition may be impacted by the choice of dispersing agent for the zinc particles. The examples demonstrate that the evaluated surface treatments may be used to assist in dispersing the zinc particles without deteriorating the corrosion performance of the electrodeposited coating.

Example 17: Evaluation of Cross-Linked Zinc Particle Surface Treatment

Treatment of Treated Zinc Powder Treated with Cross-linking Agent: Zinc powder (1500. g, Ultrapure #4) was obtained from Purity Zinc Metals (PZM, Clarksville, TN) was added to a 1200-mL stainless-steel beaker. Methyl isobutylketone (500 g) was then added to beaker containing zinc powder. The slurry was stirred at 600 RPM using an overhead stirrer (Scilogex OS20-S available from Scilogex LLC Rocky Hill, CT). DYNASYLAN 4148 (15.0 g, 1.0 wt. % on the total weight of zinc particles) available from Evonik (Parsippany, NJ) was added to the stirring slurry followed by deionized water (1.0 g). The suspension was stirred for 3 hours. After 3 hours, Tyzor AA (7.5 g, 0.5 wt. % on the total weight of zinc particles) available from Sigma Aldrich was added to the slurry. The suspension was stirred for an additional 16 hours. The material was then filtered using a Buchner funnel and rinsed with excess MIBK. The treated zinc powder was scraped into an aluminum baking dish and was allowed to air dry for 24 hours.

Preparation of Zinc-Rich Electrodepositable Coating Composition with Zinc Powder Treated with Crosslinking Agent (ZRE XL): An anionic electrodepositable coating composition was prepared using the same method as in Example 11, with the exception that the following amounts of materials were used: 500 g of treated Zn powder that had been exposed to Tyzor AA described above, 182.3.0 g of AR394 resin, 0.8 g of DMEA, 5.6 g of ACRYSOL TT-615 and 1720.0 g of deionized water.

Cold rolled steel test panels (4"×12") were obtained from ACT Test Panel Technologies of Hillsdale, MI (Item #28110, audit grade, cut only, unpolished). Panels were cut into 4"×4" squares and a hole punched in the panel prior to alkaline cleaning. The test panels were cleaned in the same manner as in Example 12 using Treatment Method C outlined in Table 14 above. After alkaline cleaning of the panels, a zinc-rich electrodepositable coating composition, either ZRE XL or the anionic zinc-rich electrodepositable coating composition as described in Example 11, was electrodeposited onto the panel by the same procedure described in Example 12 with coating conditions of 200 V, 90° F. bath temperature, 15 coulombs, and a 4 amperes limit. After electrodeposition, the panels were subjected to a 10 minutes ambient flash. Subsequently, the panels were placed into an electric oven and baked for 30 minutes at 375° F. using the same procedure as Example 11. The DFT of the electrodeposited coatings was 1.3 mils.

A set of the coated panels was then electrocoated using the same cationic electrodepositable coating composition, Framecoat II, and procedure as described in Example 11. After electrodeposition of the second coating layer, the panels were processed in the same manner as previously described. The DFT of the second electrodepositable layer was 1.0 mil.

Panels were scribed with a 2-inch vertical line in the middle of the panel down to the metal substrate. Panels were exposed to GM cyclic corrosion test GMW14872 for 10 days. The corrosion resistance for panels having only the zinc-rich electrodepositable coating were evaluated according to the parameters set forth in Table 11. For panels with the two-coat system (ZRE+Framecoat 11), the scribe creep was measured and the % white in the scribe was reported.

TABLE 26

Results of Corrosion Testing for Zn-Rich Coated Only Conditions.

| Zinc Rich Ecoat | Tyzor AA Application | GMW14872 Rating |
|---|---|---|
| ZRE of Ex. 11 | No | 5 |
| ZRE XL | Yes | 5 |

TABLE 27

Results of Corrosion Testing for Two Coat Systems Panels.

| | | GMW14872 Rating | |
|---|---|---|---|
| Zinc Rich Ecoat | Tyzor AA Application | Scribe Creep (mm) | % White Rust in Scribe[4] |
| ZRE of Ex. 11 | No | 3.0 | 0% |
| ZRE XL | Yes | <1.0 | 50% |

[4]Sum of red rust (iron oxide) and white rust (zinc oxide) in scribe equals 100%

The results demonstrate that the cross-linking treatment of the silane surface treated zinc powder demonstrated equivalent or superior corrosion protection in cyclic corrosion testing compared to zinc powder treated with the silane surface treatment alone.

Example 18: Evaluation of Zinc Flake

Synthesis Anionic Acrylic Resin (AAR): This resin was prepared using the charges described in Table 28 according to the following procedure:

TABLE 28

Charges for Synthesis of Anodic Acrylic Resin.

| Charge# | Chemical(s) (amount, g) | Supplier |
|---|---|---|
| 1 | Butanol (333.2 g) | PPG |
| 2 | Methacrylic acid (239.4 g), styrene (848.8 g), butyl acrylate (848.8 g), Hydroxyethyl acrylate (228.5 g), tertiary dodecyl mercaptan (70.6 g), butanol (5.1 g) | PPG |
| 3 | Butanol (113.8 g), t-butylperbenzoate (26.2 g) | PPG and Sigma Aldrich |
| 4 | Butanol (200.4 g), AMPS 2401 mononer (10.9 g), diisopropanolamine (7.3 g) | PPG |
| 5 | Butanol (25.5 g), t-butylperbenzoate (5.9 g) | PPG and Sigma Aldrich |
| 6 | Deionized water (205.8 g) | PPG |
| 7 | DMEA (110.2 g), deionized water (17.1 g) | PPG |

In a 5-liter flask, charge #1 was added and heated to reflux. Then charges #2, #3, and #4 were added over 3 hours. After those additions were completed, the reaction was held at 120° C. for 30 minutes. Next, half of charge #5 was added over 10 minutes and held for 60 minutes. The remainder of charge #5 was then inducted into the flask over 10 minutes and held for another 60 minutes. The reaction mixture was then cooled to 115° C. and distilled under vacuum. The amount of material removed via distillation was 644.4 grams. The reaction was then cooled and charge #6 was then added. After the temperature reached 95° C., charge #7 was slowly added into the flask. The reaction was held at 95° C. for 30 minutes. The resulting anionic acrylic resin was then stored in a lined-metal can.

Preparation of Zinc-Rich Electrodepositable Coating Composition Using Zn Flake (ZRE FLK): Melamine crosslinker CYMEL 1130 (9.91 g), available from Cytek Industries Inc., and anionic acrylic resin synthesized above (64.1 g) were added to a stainless-steel beaker and dispersed for 15 minutes on high using a cowles blade. Then, Ektasolve EEH (4.6 g), available from Eastman, was added and the mixture was agitated for another 10 minutes. Deionized water (80 g) was then charged into the mixture until the viscosity did not visually change. After 10 minutes of further mixing, untreated zinc flake (259.7 g) available from Alfa Aesar was uniformly added to the top of the stainless-steel beaker. Dispersion continued for an hour during which DYNASYLAN 4148 (2.6 g) was charged into the mixture. More deionized water (598 g) was added to reduce the bath solids followed by ACRYSOL TT-615 (3.82 g). Stirring continued for another 10 minutes. Finally, 598 g of deionized water was added to produce the final zinc-rich electrodepositable coating composition having a pigment-to-binder ratio (P:B) of 4.0:1.0.

Cold rolled steel test panels (4"×12") were obtained from ACT Test Panel Technologies of Hillsdale, MI (Item #28110, audit grade, cut only, unpolished). Panels were cut into 4"×6" rectangles and a hole punched in the panel prior to alkaline cleaning. The test panels were cleaned in the same manner as in Example 12 using Treatment Method C outlined in Table 14 above. After alkaline cleaning of the panels, a zinc-rich electrodepositable coating composition, either ZRE FLK or the anionic zinc-rich electrodepositable coating composition as described in Example 11, was electrodeposited onto the panel by the same procedure described in Example 12 with coating conditions of 200 V, 90° F. bath temperature, 15 coulombs, and a 4 amperes limit. After electrodeposition, the panels were subjected to a 10 minutes ambient flash. Subsequently, the panel was placed into an electric oven and baked for 30 minutes at 375° F. using the same procedure as Example 11. The DFT of the electrodeposited coatings was 1.0 mil.

Panels were scribed with a 2-inch vertical line in the middle of the panel down to the metal substrate. Panels were placed into NSS testing according to ASTM B-117 for 10 days. The corrosion resistance for panels were evaluated according to the parameters set forth in Table 11.

TABLE 29

Corrosion Results for Comparing Zn Powder and Zn Flake.

| Ecoat Bath | Zinc Type | Zn-Rich Only Corrosion Rating |
| --- | --- | --- |
| ZRE of Ex. 11 | Powder | 2 |
| ZRE FLK | Flake | 5 |

As shown in Table 29, zinc-rich coatings applied by electrodeposition having thinner thicknesses (1.0 mil) showed improved corrosion performance with a zinc flake particle over the zinc powder particle, as evaluated by ASTM B-117.

Example 19: Evaluation of High Molecular Weight Volatile Groups Containing Curing Agent Preparation of Melamine Curing Agent Substituted with High Molecular Weight Volatile Group (Substituted Melamine Curing Agent): 497.6 grams of CYMEL 1156 (n-butylated melamine resin available from Cytek, Industries Inc.), 500 grams diethylene glycol monobutyl ether, and 3.4 grams phenyl acid phosphate were added to a two-liter flask and slowly heated to 120° C. The mixture was then held at this temperature for four hours. Upon completion of the hold, the reaction was complete and the solution was poured out of the flask. During reaction, the diethylene glycol monobutyl ether substituted for the lower weight alcohols present in the curing agent.

Preparation of Zinc-Rich Electrodepositable Coating Composition with Substituted Melamine Curing Agent (ZRE HWL): An anionic zinc-rich electrodepositable coating composition was prepared according to the following procedure using the ingredients listed in Table 30 below

TABLE 30

Materials Used to Produce ZRE HWL.

| Ingredient # | Description | Amount (g) |
| --- | --- | --- |
| 1 | Anionic Acrylic Resin (AAR)[1] | 88.9 |
| 2 | Substituted Melamine Curing Agent[2] | 33.87 |
| 3 | Ethylene glycol monobutyl ether | 4.42 |
| 4 | 2-Ethylhexanol | 4.12 |
| 5 | Eastman EEH Solvent[3] | 6.83 |
| 6 | PZM UP#4 Zinc Dust[4] | 339 |
| 7 | DYNASYLAN 4148[5] | 3.39 |
| 8 | ACRYSOL TT-615[6] | 7.5 |
| 9 | Deionized water Company | 1786 |

[1]As described in Example 18
[2]As described above
[3]Available from Eastman Chemical Company
[4]Available from Purity Zinc Metals
[5]Polyethylene glycol functional alkoxysilane available from Evonik Industries
[6]A rheology modifier available from The Dow Chemical Company Ingredients 1 and 2 were added to a 600 mL stainless-steel beaker and placed under high agitation using a cowles blade. After 15 minutes of mixing, Ingredients 3, 4, and 5 were added dropwise. After an additional 15 minutes of mixing, 80 grams of Ingredient 9 were added. After an additional 10 minutes of mixing, Ingredient 6 was slowly added over 5 minutes. Ingredient 7 was then added and the resin blend mixture was allowed to stir for 1 hour. The mixture was then slowly thinned down with 400 grams of Ingredient 9. The resin blend mixture was then transferred to a 1-liter stainless-steel beaker and kept under agitation. Ingredient 8 was then mixed with 400 grams of Ingredient 9 and added to the resin blend mixture. After five minutes of mixing, the resin blend mixture was transferred to a 2-liter container and the remainder of Ingredient 9 was slowly added while under mild agitation. The electrodepositable coating composition had a theoretical solids content of 19.35% by weight, about 77% by weight zinc metal based on total solids weight, a P:B of about 3.4:1.0, and a pH of 9.3.

Preparation of Zinc-Rich Electrodepositable Coating Composition with Standard Melamine Curing Agent (ZRE LWL): This bath was made in a manner analogous to ZRE HWL except CYMEL 1130 was used in place of the substituted melamine curing agent. The exact amounts used to make ZRE LWL are in Table 31 below. The final bath had a theoretical solids content of 27%, about 89% zinc metal based on total solid weight, a P:B ratio of about 9.0:1.0.

TABLE 31

Materials Used to Produce ZRE LWL.

| Ingredient # | Description | Amount (g) |
| --- | --- | --- |
| 1 | Anodic Acrylic Resin (AAR) | 57.7 g |
| 2 | Cymel 1130[2] | 9.1 g |
| 3 | Ethylene glycol monobutyl ether | 2.7 g |

TABLE 31-continued

Materials Used to Produce ZRE LWL.

| Ingredient # | Description | Amount (g) |
|---|---|---|
| 4 | 2-Ethylhexanol | 2.6 g |
| 5 | Eastman EEH Solvent[3] | 4.22 g |
| 6 | PZM UP#Zinc Dust[4] | 547 g |
| 7 | Dynasylan 4148[5] | 5.5 g |
| 8 | Acrysol ™ TT-615[6] | 6.2 g |
| 9 | Deionized water | 1635 g |

[1]As described in Example 17
[2]Melamine curing agent available from Cytek Industries, Inc.
[3]Available from Eastman Chemical Company
[4]Available from Purity Zinc Metals
[5]Polyethylene glycol functional alkoxysilane available from Evonik Industries
[6]A rheology modifier available from The Dow Chemical Company Throw power of the electrodepositable coating compositions was tested using a shim throw test. Two 4"×6" panels were held together using a wood composite (insulating) gasket while leaving an opening at the bottom of the two panels to allow paint to be deposited between the two panels during electrodeposition. Throw power is determined by comparing the distance that the electrocoat travels up the backs of the panels relative to the depth of immersion and is expressed as a percentage. Approximately 4-5 mils of the electrodepositable coating compositions were deposited onto the front (unobstructed) face of the panels.

The panels were scribed with a 3-inch vertical line in the middle of the panel down to the metal substrate. Panels were placed into NSS testing according to ASTM B-117 for 10 days to evaluate for galvanic protection. The panel was determined to provide galvanic protection and receive a "yes" rating if white corrosion products were present in the scribe; a panel received a "no" rating if no white corrosion products were present. The results are provided in Table 32 below.

TABLE 32

Throw Power Comparison and Corrosion Results for Melamine Variants.

| ZRE Bath | P:B | Immersion Depth (cm) | Height of Deposition on Back of Panel (cm) | % Throw Power | Galvanic Protection in Salt Spray |
|---|---|---|---|---|---|
| ZRE of Ex. 11 | 9:1 | 12.5 | 1.8 | 14 | Yes |
| ZRE STM | 3.3:1 | 12.5 | 2.8 | 22 | Yes |

As shown in Table 32, the use of the substituted melamine curing agent allowed for an improvement in throw power over the composition that included the standard melamine curing agent. Without intending to be bound by any theory, this may be because the higher molecular weight of the substituted melamine curing agent produced more insulation during electrodeposition. However, the substituted melamine curing agent did not impair the galvanic protection of the electrodeposited coating. Without intending to be bound by any theory, this may be because the greater weight loss increases the relative P:B more upon curing than with a standard curing agent that volatilizes lower molecular weight species.

Example 20: Evaluation of the Addition of Non-Metal Electrically Conductive Particles Treatment of Zinc Powder: Zinc powder (Ultrapure #4) obtained from Purity Zinc Metals (PZM, Clarksville, TN) was treated according to the method described in Example 11, except that the following amounts and materials were used: 1000 g zinc powder, 333 g MIBK, 10.0 g DYNASYLAN 4148, and 0.7 g deionized water.

Preparation of Electrodepositable Coating Composition with Carbon Black and Zinc ZRE CB-1): Powercron black tint paste (365.2 g) containing anionic resin and carbon black available from PPG was added to a stainless-steel beaker and stirred using a conn blade. DMEA (0.8 g) was added with 100 g of deionized water and agitation continued for five minutes. Then, the beaker was charged with ACRYSOL TT-615 (6.2 g) and 100 mL of deionized water. Stirring was continued for 10 minutes after which 185.5 g of the treated zinc powder (described above) slurried in 263.0 g of deionized water was added. The electrodepositable coating composition was continuously agitated and used to coat panels for corrosion testing. ZRE CB-1 had 19% by weight carbon black from the paste, based on the total solids of the composition, and had a zinc to binder weight ratio of 3.0.

Preparation of Electrodepositable Coating Composition with Carbon Black and Zinc (ZRE CB-2): 186.0 g of AR394 anionic resin was added to a stainless-steel beaker with agitation using a conn blade. Then a solution of DMEA (0.9 g in 100 g of deionized water) was charged into the beaker and stirred for five minutes. Then, 7.4 g of ACRYSOL TT-615 diluted with 100 g of deionized water was added to the bath while stirring was continued for 10 minutes. Next, 300.0 g of ZRE CB-1 was added to the stainless-steel beaker while stirring for five minutes. Finally, 168.0 g of treated zinc powder (described above) slurried in 130.0 g of deionized water was charged into the steel beaker. The electrodepositable coating composition was continuously agitated and was designated as ZRE CB-2, which was 5.5% by weight carbon black, based on the total solids of the composition, and had a zinc to binder weight ratio of 3.0.

Preparation of Electrodepositable Coating Composition with Carbon Black and Zinc (ZRE CB-3): 244.8 g of AR394 anionic resin was added to a stainless-steel beaker with agitation using a conn blade. Then a solution of DMEA (1.2 g in 50 g of deionized water) was charged into the beaker and stirred for five minutes. Then, 9.0 g of ACRYSOL TT-615 diluted with 100 g of deionized water was added to the bath while stirring was continued for 10 minutes. Next, 276.0 g of ZRE CB-1 was added to the steel beaker while stirring for five minutes. Finally, 129.8 g of treated zinc powder (described above) slurried in 90.0 g of deionized water was charged into the steel beaker. The electrodepositable coating composition was continuously agitated and was designated as ZRE CB-3, which was 5.5% by weight carbon black, based on the total solids weight of the composition, and had a zinc to binder weight ratio of 2.0.

Preparation of Electrodepositable Coating Composition with Carbon Black and Zinc (ZRE CB-4): 334.0 g of AR394 anionic resin was added to a stainless-steel beaker with agitation using a conn blade. Then a solution of DMEA (1.6 g in 100 g of deionized water) was charged into the beaker and stirred for five minutes. Then, 12.0 g of ACRYSOL TT-615 diluted with 100 g of deionized water was added to the bath while stirring was continued for 10 minutes. Next, 300.0 g of ZRE CB-1 was added to the steel beaker while stirring for five minutes. Finally, 300.5 g of treated zinc powder (described above) slurried in 432.5 g of deionized water was charged into the steel beaker. The electrodepositable coating composition was continuously agitated and was designated as ZRE CB-4, which was 3.5% by weight carbon black, based on the total solids weight of the composition, and had a zinc particle to binder ratio of 3.0.

Bath ZRE CB-1 was coated out on 2"×3" zinc phosphate (Chemfos 700 with deionized water post rinse, C700) pretreated panel available from ACT using the procedure described above. Application parameters were: 200V, 90° F., 3.8 ampere range, and 22.7 coulombs.

Cold rolled steel test panels (4"×12") were obtained from ACT Test Panel Technologies of Hillsdale, MI (Item #28110, audit grade, cut only, unpolished). Panels were cut into 2"×3" squares and punched with a hole prior to degreasing with acetone and aromatic 100. After degreasing of the panels, the electrodepositable coating compositions from CB-2, CB-3, CB-4 were electrodeposited onto the panels by the same procedure described in Example 12 with coating conditions of 30 V, 90° F. bath temperature, a 5 ampere limit, and a coulomb range of 11-16. The back face of the coated panels (the side of the panel facing away from the counter cathode during electrodeposition) was evaluated to determine the percentage of coating that electrodeposited relative to the front side of the panel.

Panels coated out of ZRE CB2, ZRE CB3, and ZRE CB-4 were scribed with a 1-inch vertical line in the middle of the panel down to the metal substrate. Panels were placed into neutral salt spray testing according to ASTM B-117 for 24 hours. Zinc activity was judged based on the formation of white rust on the scribe, face, and edges of the panels.

TABLE 33

Impact of Zinc:Binder Ratios on Performance.

| ZRE Eoat | Zinc:Binder Weight Ratio | Carbon Black Loading | Back DFT % of Front | Film Resistivity | Zinc Active in Salt Spray |
|---|---|---|---|---|---|
| ZRE CB-1 | 3 | 19.0% | 0%[1] | Not measured | Not tested |
| ZRE CB-2 | 3 | 5.5% | 44%[2] | 3.5 kΩ | Yes |
| ZRE CB-3 | 2 | 5.5% | 100%[3] | 230 kΩ | No |
| ZRE CB-4 | 3 | 3.5% | 76%[2] | 130 kΩ | No |

[1] Ability to coat back face (away from cathode) was testing on zinc phosphated (C700) steel available from ACT.
[2] DFT on front face was 1.7 mils.
[3] DFT on front face was 0.9 mils. This low film build likely resulted in poor corrosion results despite equal film thickness on the front and back of the panels.

As shown in Table 33, at lower zinc:pigment ratios, galvanic protection can still be achieved by the addition of secondary (not galvanically active) electrically conductive particles.

Example 21: Evaluation of Two Zinc-Rich Coating System

A metal-rich film-forming composition (ZR1) was prepared according to the following procedure using ingredients listed in Table 34 below: Ingredient 2 was charged to a 100 mL stainless-steel beaker and placed on mild agitation with a mechanical stirrer. Ingredient 4 was added to half of Ingredient 5 in a separate container and then added to Ingredient 2 and allowed to mix for 5 minutes. Ingredient 3 was then added to the mixture and allowed to mix for 15 minutes. Ingredient 1 was then added to the mixture and allowed to mix for 30 minutes. The remainder of the Ingredient 5 was then added to the mixture and allowed to mix for 10 minutes. The final composition had a theoretical solids content of 39.9%, about 82.6% by weight zinc powder, based on total solids weight, a P:B ratio of about 9.9:1.0, and about 8.2% carbon black based on total solid weight.

TABLE 34

Zn-Rich Formulation for Draw Down High Zn-Content Coating.

| Ingredient # | Description | Amount (g) |
|---|---|---|
| 1 | Zinc Dust PZM UP4 | 34.9 |
| 2 | Powercron 370-2 Black Tint | 21.5 |
| 3 | ACRYSOL TT-615 | 0.91 |
| 4 | Dimethyl Ethanolamine | 0.12 |
| 5 | Deionized water | 48.5 |

An anionic zinc-rich electrodepositable coating composition (ZR2) was prepared according to the following procedure using ingredients listed in Table 35: Ingredient 2 was charged to a 1200 mL stainless-steel beaker and placed on mechanical agitation. Ingredient 4 was mixed with 50 grams of Ingredient 5 and added to Ingredient 2. After 5 minutes, Ingredient 3 was added to 150 grams of Ingredient 5 and then added to the agitated resin blend. After 15 minutes of mixing, Ingredient 1 was slurried with 200 grams of Ingredient 5 and then added to the agitated resin blend. After 10 minutes of mixing, the material was transferred to a 2.5-liter container and the remainder of Ingredient 5 was added over 10 minutes. The final bath had a theoretical solids content of 20.26%, about 75% zinc metal based on total solid weight, and a P:B ratio of about 3.0:1.0. Coating from the second anionic film-forming binder was electrodeposited overtop of the drawdown coating from the first anionic film-forming binder at a preferred film build of 2 mils. Electrodeposition was conducted as previously described.

TABLE 35

Zn-Rich Formulation for Draw Down High Zn-Content Coating.

| Ingredient # | Description | Amount (g) |
|---|---|---|
| 1 | Zinc Dust Treated 1% with Dynasylan 4148 | 375 |
| 2 | Powercron AR394 Resin | 426 |
| 3 | ACRYSOL TT-615 | 8.3 |
| 4 | Dimethyl Ethanolamine | 1.11 |
| 5 | Deionized water | 1658 |

Zinc phosphate treated cold rolled steel panels (4"×12") were obtained from ACT Test Panel Technologies of Hillsdale, MI (Item #28110, audit grade, cut only, unpolished) and used for the example. Panels were cut into 4"×6" rectangles and punched with a hole prior to alkaline cleaning. The test panels were degreased using acetone and Aromatic 100.

Two sets of panels were prepared. The first set of panels was only treated with ZR2 and was applied via electrodeposition. Electrodeposition was conducted in the same manner as described above using the following application conditions: 105° F., 250V, 18 coulombs, no current limit. The DFT of ZR2 only coated panels was 2.5 mils. The second set of panels was a two-coat system comprised of ZR1 and ZR2. ZR1 was applied at 0.5 mils using a wire wound drawdown rod. Panels coated with ZR1 were then electrocoated using ZR2 with a DFT of 2.0 mils. Electrodeposition was conducted in the same manner as described above using the following application conditions: 105° F., 30V, 16 coulombs, no current limit. The total film build for the panels coated with ZR1 and ZR2 was 2.5 mils.

The panels were scribed down to metal in the center of the panel and were submitted to neutral salt spray testing according to ASTM B-117 for 500 hours and evaluated for the presence of red rust. The results are reported in Table 36.

TABLE 36

Corrosion Results for 2.5 mil Zn-Rich Coatings.

| Condition | First Coat (DFT) | Second Coat (DFT) | Corrosion Results |
|---|---|---|---|
| Single Coating | — | ZR2 (2.5 mils) | 100% Red Rust in Scribe |
| Two coat system having differing P:B | ZR1 (0.5 mils) | ZR2 (2.0 mils) | No Red Rust in Scribe |

As shown in Table 36, the two-coat system having a mixture of high and low zinc content layers provided better galvanic protection than a single layer of the lower zinc-content coating alone at equal film thicknesses.

Example 22—Preparation of a Cationic Zinc-Rich Electrodepositable Coating Composition Preparation of a Blocked Polyisocyanate Curing Agent for Electrodepositable Coating Compositions (Curing Agent I): A blocked polyisocyanate crosslinker (Curing Agent I), suitable for use in electrodepositable coating resins, was prepared using the ingredients listed in Table 37 by the following procedure: Components 1-3 were mixed in a flask set up for total reflux with stirring under nitrogen. Component 4 was then introduced dropwise to the reaction mixture so that the temperature increased due to the reaction exotherm, and the temperature was maintained under 52° C. After the addition of Component 4 was complete, a temperature of 65° C. was established and the reaction mixture held at temperature for 30 min. Component 5 was then introduced and the heating source removed from the reaction vessel. Component 6 was added to the reaction mixture. Following an exotherm, a temperature of 75° C. was established and the reaction mixture held at temperature for 30 min. The heat source was then removed, Component 7 introduced, and, after the completion of an exotherm, a temperature of 75° C. was established and the reaction mixture held at temperature for 30 min. The heat source was removed again, followed by the addition of Component 8. After the completion of an exotherm, a temperature of 105° C. was established and the reaction mixture held at temperature until no residual isocyanate was detected by IR spectroscopy. Components 9 and 10 were then added and the reaction mixture was allowed to stir until homogenous and cooled to ambient temperature.

TABLE 37

Materials used to Prepare Curing Agent I.

| No. | Component | Parts-by-weight (grams) |
|---|---|---|
| 1 | Isophorone diisocyanate | 700 |
| 2 | Methyl isobutyl ketone | 65.38 |
| 3 | Dibutyltin dilaurate | 1.08 |
| 4 | Diethylene glycol monobutyl ether | 560.99 |
| 5 | Dibutyltin dilaurate | 1.08 |
| 6 | Trimethylolpropane | 43.12 |
| 7 | Trimethylolpropane | 43.12 |
| 8 | Trimethylolpropane | 43.12 |
| 9 | 1-Methoxy-2-propanol[1] | 162.62 |
| 10 | Propylene Glycol Phenyl Ether[2] | 365.95 |

[1]Dowanol PM available from Dow Chemical
[2]Dowanol PPh available from Dow Chemical Preparation of a Cationic, Amine-Functionalized, Polyepoxide-Based Resin (Cationic Film-Forming Resin A): A cationic, amine-functionalized, polyepoxide-based polymeric resin was prepared using the materials listed in Table 38 by the following Procedure: Components 1-6 listed were combined in a flask set up for total reflux with stirring under nitrogen. The mixture was heated to a temperature of 125° C. and allowed to exotherm (175° C. maximum). A temperature of 160-165° C. was established/maintained in the reaction mixture and the reaction mixture was then held at temperature for 2 hours. Component 7 was added and the reaction mixture further held at temperature until an epoxy equivalent weight (EEW) of 2273 was achieved as determined using a Metrohm 799 MPT Titrino automatic titrator utilizing a 1 M perchloric acid solution in acetic acid. Components 8-9 were then introduced and a temperature of 90° C. was established. Components 10-12 were premixed and then introduced to the reaction vessel, and the reaction mixture held at 90° C. for 2 hours. The reaction mixture was further held at temperature until the acid value was less than 3 or the change in acid value was less than 0.5 units/hour. The acid value was measured using a Metrohm 799 MPT Titrino automatic titrator utilizing a 0.1 M potassium hydroxide solution in methanol. Component 13 was then introduced, and the reaction mixture allowed to stir for 30 min, resulting in Cationic Film-Forming Resin A.

A portion of Cationic Film-Forming Resin A, listed as Component 14 in Table 38, was then poured into Component 15 and the resulting resin dispersion was stirred for 30 min. Component 16 was then added to further dilute the resin dispersion to form Cationic Film-Forming Binder A Dispersion.

TABLE 38

Materials used to make Cationic-Film-Forming Resin A.

| No. | Component | Parts-by-weight (grams) |
|---|---|---|
| | Resin Synthesis Stage | |
| 1 | Bisphenol A diglycidyl ether [1] | 71.8 |
| 2 | Bisphenol A | 73.0 |
| 3 | Polyoxypropylene diglycidylether[2] | 121.2 |
| 4 | Nonyl phenol | 5.4 |
| 5 | N-Butoxypropanol[3] | 36.6 |
| 6 | Ethyl triphenyl phosphonium iodide | 0.4 |
| 7 | Ethyl triphenyl phosphonium iodide | 0.4 |
| 8 | N-Butoxypropanol[3] | 25.00 |
| 9 | 1-Methoxy-2-propanol[4] | 23.7 |
| 10 | Dimethylethanolamine | 10.9 |
| 11 | Lactic Acid (88%) | 11.9 |
| 12 | Deionized water | 22.0 |
| 13 | Crosslinker I[5] | 237.1 |
| | Resin Dispersion Stage | |
| 14 | Resin Synthesis Product A | 543.2 |
| 15 | Deionized water | 385.8 |
| 16 | Deionized water | 97.8 |

Preparation of Treated Zn Dispersion: Zinc dust treated with a silane dispersing agent (DYNASYLAN 4148) was prepared in the following manner: 750 g of zinc dust (UltraPure #4 Zinc dust, available from Purity Zinc Metals) and 250 g of methyl isobutyl ketone were sequentially combined in a glass container, and the blend was subjected to mechanical mixing. After the zinc dust was completely wetted, 7.5 g of DYNASYLAN 4148 (Polyethylene glycol functional alkoxysilane available from Evonik Industries) was added dropwise to the mixture, followed by the dropwise addition of 0.5 g of deionized water. The mixture was allowed to stir overnight and the solvent was then removed from the treated zinc using a Buchner funnel and a vacuum pump. The treated zinc dust was placed in an aluminum pan and allowed to air dry in a fume hood overnight, followed by annealing in a vacuum oven at 110-115° C. for 2 hours.

Preparation of a Cationic Epoxy-Based Electrodepositable Zinc Rich Coating Composition (ZRE CAT): A cationic epoxy-based zinc-rich electrodepositable coating composition was prepared utilizing the Cationic Film-Forming Binder A Dispersion, the treated zinc dust as described above, and deionized water according to the amounts listed in Table 39. Component 1 was weighed into a 600 mL steel beaker and placed under agitation using a cowles blade. Component 2 was introduced and the resulting mixture stirred for 1 hour. Component 3 was slowly added to the blend, and the blend was stirred for 20 minutes. The resulting mixture was then removed from agitation and transferred to a 1 L glass container. Mild agitation was continued using a magnetic stir plate and a magnetic stir bar, and Component 4 was slowly added to the blend. The final bath had a theoretical solids content of 27% by weight and a pigment (zinc dust) to binder ratio of 9.0/1.0.

TABLE 39

Materials used to produce cationic electrodepositable coating composition

| No. | Component | Parts-by-weight (grams) |
| --- | --- | --- |
| 1 | Cationic Film-Forming Binder A Dispersion | 84.2 |
| 2 | Propylene Glycol Phenyl Ether[1] | 3.6 |
| 3 | Treated Zinc Dust | 295.4 |
| 4 | Deionized water | 845.9 |

[1]Dowanol PPh available from Dow Chemical

Electrodeposition of the Cationic Epoxy-Based Electrodepositable Zinc Rich Coating Composition: 4"×12" bare cold rolled steel panels (ACT 28110) were cleaned by means of an alkaline spray cleaner by the following procedure: The cleaner tank was filled with 37,450 mL of deionized water, 500.0 mL of Chemkleen 2010 LP and 50.0 mL of Chemkleen 181ALP and was heated to 120° F. The 4"×12" panels were placed into the tank and spray cleaned for 2 minutes. They were removed from the cleaner tank and rinsed with deionized water. The panels were then placed between 2 air dryers until completely dry. The panels were cut into 2"×3" panels, wrapped in inhibitor paper, and kept in a desiccator until time of use.

The cationic epoxy-based zinc-rich electrodepositable coating composition prepared above (ZRE CAT) was electrodeposited over the cleaned panels by cationic electrodeposition using oppositely placed dual cathodes. Coating conditions were 120 volts at a bath temperature of 90° F. and no limit was placed on amperage. The coat outs were limited to 30-90 sec per 2"×3" panel. The coated panels were baked in an electric oven for a period of 30 minutes at 410° F. The resulting films were smooth and continuous. Dried film thickness was 1-2 mils depending on the coating conditions. The ability of the coating to provide a substrate galvanic protection was gauged by the development of white rust (zinc corrosion product) in salt spray corrosion testing according to ASTM B-117. White rust was present on the face and scribe of each of the coated panels indicating that the coating did provide galvanic protection to the coated substrate.

A set of panels coated with the cationic epoxy-based zinc-rich electrodepositable coating composition (ZRE CAT) baked as described above were subsequently electrocoated with a second electrodepositable coating layer, and additional uncoated, cleaned panels were also coated by the same electrodepositable coating composition. The electrodepositable coating composition was a non-zinc-rich, cationic epoxy system (Powercron® FrameCoat™ II available from PPG Industries) prepared according to manufacturer instructions. The coating conditions for applying the Powercron® FrameCoat™ II by cationic electrodeposition to the zinc-rich coated and bare panels were 250 volts at a bath temperature of 90° F. for 120 seconds. After coating, the coated panels were baked in an electric oven for a period of 30 minutes at 350° F. The resulting films were continuous, and had a dried film thickness of about 1 mil either over the first electrocoat layer or bare panel. The ability to provide protection against corrosion was gauged by measuring the scribe creep on scribed panels after 240 hours of salt spray corrosion testing according to ASTM B-117. The results are provided in Table 40 below.

TABLE 40

| Coating | Scribe Creep Width (Millimeters) |
| --- | --- |
| FrameCoat II on Bare Steel-control | 3.4 |
| Frame Coat II on Cationic Epoxy Zinc Rich Composition | 0.5 |

These results show that the use of the cationic epoxy-based zinc-rich electrodepositable coating composition provides improved corrosion performance.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

What is claimed is:

1. An electrodepositable coating composition comprising:
   a film-forming binder, wherein the film-forming binder comprises an ionic salt group-containing, film-forming polymer and a curing agent;
   electrically conductive particles; and
   an aqueous dispersion medium;
   wherein the electrically conductive particles comprise zinc particles present in an amount of at least 80% by weight, based on the total solids weight of the electrodepositable coating composition.

2. The electrodepositable coating composition of claim 1, wherein the electrically conductive particles further comprise aluminum, magnesium, zinc/aluminum alloy, zinc/tin alloy, or combinations thereof.

3. The electrodepositable coating composition of claim 1, wherein the zinc comprises surface treated zinc.

4. The electrodepositable coating composition of claim 3, wherein the surface treatment comprises a silane.

5. An electrodepositable coating composition comprising:
a film-forming binder; and
electrically conductive particles;
  wherein the electrically conductive particles are present in an amount of at least 25% by weight, based on the total solids weight of the electrodepositable coating composition;
wherein the electrically conductive particles comprise aluminum particles, and the composition has an aluminum particle to binder weight ratio of at least 3:1.

6. The electrodepositable coating composition of claim 1, wherein the electrically conductive particle comprises zinc particles, and the composition has a zinc particle to binder weight ratio of at least 2:1.

7. The electrodepositable coating composition of claim 1, wherein the ionic salt group-containing, film-forming polymer comprises a cationic salt group-containing, film-forming polymer.

8. An electrodepositable coating composition comprising:
a film-forming binder, wherein the film-forming binder comprises an anionic salt group-containing, film-forming polymer and a curing agent;
electrically conductive particles; and
an aqueous dispersion medium;
  wherein the electrically conductive particles comprise zinc particles present in an amount of at least 80% by weight, based on the total solids weight of the electrodepositable coating composition.

9. The electrodepositable coating composition of claim 1, wherein the curing agent comprises an at least partially blocked polyisocyanate, an aminoplast resin, a phenoplast resin, or combinations thereof.

10. The electrodepositable coating composition of claim 1, wherein the curing agent comprises high molecular weight volatile groups.

11. The electrodepositable coating composition of claim 1, wherein the electrodepositable coating composition is substantially free of lithium-containing particles.

12. The electrodepositable coating composition of claim 1, wherein the electrically conductive particles to binder volume ratio is 0.5:1 to 3:1.

13. The electrodepositable coating composition of claim 1, wherein the electrically conductive particles further comprise non-metal conductive particles.

14. The electrodepositable coating composition of claim 1, further comprising a rheology modifier.

15. The electrodepositable coating composition of claim 1, further comprising a corrosion inhibitor.

16. A method of coating a substrate, the method comprising:
electrophoretically applying the electrodepositable coating composition of claim 1 to at least a portion of the substrate to form a coating.

17. The method of claim 16, further comprising subjecting the coating to curing conditions sufficient to at least partially cure the coating, wherein the curing conditions comprise heating the substrate.

18. The method of claim 17, wherein heating the substrate comprises heating the substrate to a temperature wherein at least a portion of the binder undergoes pyrolysis.

19. The method of claim 16, further comprising contacting the substrate with a sealing composition after the electrodepositable coating composition is electrophoretically applied to the substrate.

20. The method of claim 16, further comprising contacting the substrate with a metallic conditioning composition before the electrodepositable coating composition is electrophoretically applied to the substrate.

21. The method claim 16, further comprising applying a film-forming composition having a pigment-to-binder ratio greater than the pigment-to-binder ratio of the electrodepositable coating composition prior to electrophoretically applying the electrodepositable coating composition.

22. An at least partially coated substrate coated by the method of claim 16.

23. The at least partially coated substrate of claim 22, further comprising a first metal-rich coating layer underneath the coating resulting from electrophoretically applying the electrodepositable coating composition of claim 1, the first metal-rich coating layer having a pigment-to-binder ratio greater than the pigment-to-binder ratio of the coating layer resulting from electrophoretically applying the electrodepositable coating composition of claim 1.

* * * * *